United States Patent
Miyanaga

(10) Patent No.: US 9,686,446 B2
(45) Date of Patent: Jun. 20, 2017

(54) IMAGE FORMING APPARATUS THAT REPRODUCES COLOR TO BE PRINTED WITH SINGLE COLOR MATERIAL ALONE AND BLACK, RECORDING MEDIUM, AND COLOR CONVERSION METHOD

(71) Applicant: KYOCERA Document Solutions Inc., Osaka (JP)

(72) Inventor: Yuka Miyanaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 4 days.

(21) Appl. No.: 14/857,334

(22) Filed: Sep. 17, 2015

(65) Prior Publication Data

US 2016/0094759 A1    Mar. 31, 2016

(30) Foreign Application Priority Data

Sep. 26, 2014    (JP) .................. 2014-196193

(51) Int. Cl.
*H04N 1/60*    (2006.01)
(52) U.S. Cl.
CPC ................. *H04N 1/6058* (2013.01)
(58) Field of Classification Search
None
See application file for complete search history.

(56) References Cited

U.S. PATENT DOCUMENTS

2012/0087576 A1*    4/2012    Abe .................. G06T 1/00
                                                    382/162

FOREIGN PATENT DOCUMENTS

JP            4766033    B2    9/2011

* cited by examiner

*Primary Examiner* — Mohammad Ghayour
*Assistant Examiner* — Lennin Rodriguezgonzale
(74) *Attorney, Agent, or Firm* — Stein IP, LLC

(57) ABSTRACT

An image forming apparatus includes a control unit with a reduction mode using a reduced consumption of the color material. The reduction rule includes a rule of conversion configured to, in a constant hue plane of the input color value, move all color values on a straight line passing through a lowest brightness color value and the input color value in a direction from a highest saturation color value to a highest brightness color value, so as to convert into color values on a straight line passing through the lowest brightness color value and a converted input color value where the input color value is converted, the lowest brightness color value being indicative of a color value of lowest brightness, the highest saturation color value being indicative of a color value of highest saturation, the highest brightness color value being indicative of a color value of highest brightness.

6 Claims, 25 Drawing Sheets

FIG. 11A

| Identification Sign | Mode | Input Color Value | | | Output Color Value (C M Y K) | | | | Output Color Value (L a b) | | |
|---|---|---|---|---|---|---|---|---|---|---|---|
| | | R | G | B | C | M | Y | K | L | a | b |
| a1 | Normal | 4/5 | 4/5 | 0 | 42 | 38 | 250 | 2 | 75.07 | -7.72 | 69.06 |
| a4 | Reduction | 4/5 | 4/5 | 1/5 | 43 | 35 | 199 | 0 | 77.09 | -8.59 | 54.19 |

FIG. 11B

| Identification Sign | Mode | Input Color Value | | | Output Color Value (C M Y K) | | | | Output Color Value (L a b) | | |
|---|---|---|---|---|---|---|---|---|---|---|---|
| | | R | G | B | C | M | Y | K | L | a | b |
| b1 | Normal | 0 | 4/5 | 4/5 | 249 | 15 | 61 | 5 | 52.42 | -42.22 | -25.00 |
| b4 | Reduction | 1/5 | 4/5 | 4/5 | 203 | 14 | 53 | 0 | 59.94 | -34.21 | -18.46 |

*FIG. 11C*

| Identification Sign | Mode | Input Color Value | | | Output Color Value (CMYK) | | | | Output Color Value (L a b) | | |
|---|---|---|---|---|---|---|---|---|---|---|---|
| | | R | G | B | C | M | Y | K | L | a | b |
| c1 | Normal | 1/8 | 1/8 | 1/8 | 210 | 200 | 158 | 102 | 23.49 | 0.57 | −3.12 |
| c4 | Reduction | 1/8 | 1/8 | 1/8 | 210 | 200 | 158 | 102 | 23.49 | 0.57 | −3.12 |

RELATED ART

| Identification Sign | Mode | Input Color Value | | | Output Color Value (CMYK) | | | | Output Color Value (L a b) | | |
|---|---|---|---|---|---|---|---|---|---|---|---|
| | | R | G | B | C | M | Y | K | L | a | b |
| a1 | Normal | 4/5 | 4/5 | 0 | 42 | 38 | 250 | 2 | 75.07 | -7.72 | 69.06 |
| a2 | Gamma-control Type Reduction | - | - | - | 32 | 29 | 188 | 2 | 79.10 | -7.80 | 52.97 |
| a3 | White Color Direction Change Type Reduction | 17/20 | 17/20 | 3/4 | 31 | 23 | 182 | 0 | 80.75 | -9.31 | 52.58 |

RELATED ART

| Identification Sign | Mode | Input Color Value | | | Output Color Value (CMYK) | | | | Output Color Value (L a b) | | |
|---|---|---|---|---|---|---|---|---|---|---|---|
| | | R | G | B | C | M | Y | K | L | a | b |
| b1 | Normal | 0 | 4/5 | 4/5 | 249 | 15 | 61 | 5 | 52.42 | −42.22 | −25.00 |
| b2 | Gamma-control Type Reduction | — | — | — | 187 | 11 | 46 | 4 | 61.86 | −31.39 | −17.91 |
| b3 | White Color Direction Change Type Reduction | 3/4 | 17/20 | 17/20 | 189 | 10 | 48 | 0 | 62.50 | −32.64 | −17.44 |

RELATED ART

| Identification Sign | Mode | Input Color Value | | | Output Color Value (CMYK) | | | | Output Color Value (L a b) | | |
|---|---|---|---|---|---|---|---|---|---|---|---|
| | | R | G | B | C | M | Y | K | L | a | b |
| c1 | Normal | 1/8 | 1/8 | 1/8 | 210 | 200 | 158 | 102 | 23.49 | 0.57 | -3.12 |
| c2 | Gamma-control Type Reduction | — | — | — | 158 | 150 | 119 | 77 | 35.91 | -0.69 | -1.68 |
| c3 | White Color Direction Change Type Reduction | 11/32 | 11/32 | 11/32 | 174 | 163 | 126 | 2 | 43.19 | -1.58 | -2.58 |

*FIG. 15C*

IMAGE FORMING APPARATUS THAT REPRODUCES COLOR TO BE PRINTED WITH SINGLE COLOR MATERIAL ALONE AND BLACK, RECORDING MEDIUM, AND COLOR CONVERSION METHOD

INCORPORATION BY REFERENCE

This application is based upon, and claims the benefit of priority from, corresponding Japanese Patent Application No. 2014-196193 filed in the Japan Patent Office on Sep. 26, 2014, the entire contents of which are incorporated herein by reference.

BACKGROUND

Unless otherwise indicated herein, the description in this section is not prior art to the claims in this application and is not admitted to be prior art by inclusion in this section.

Conventionally, the following image forming apparatus has been known. The typical image forming apparatus converts input color values such as RGB values into output color values such as CMYK values. Then, the typical image forming apparatus performs printing using a color material such as toner by an amount according to the converted output color values. Different from printing in a normal mode, there has been known a conventional image forming apparatus that can perform printing in a reduction mode, which reduces a consumption of toner.

Here, the following method (hereinafter referred to as a "gamma-control type reduction method") to reduce the consumption of the toner has been known. The typical method controls one-dimensional input-output property (gamma values) of respective toner of cyan, magenta, yellow, and black. That is, the typical method compresses respective C values, M values, Y values, and K values of the CMYK values as the output color values by an identical ratio. Thus, the typical method reduces the consumption of the entire toner of the cyan, magenta, yellow, and black.

The following another method (hereinafter referred to as an "input color value change type reduction method") to reduce the consumption of the toner has been known. The other typical method compresses a color gamut of the input color values such as the RGB values, that is, the other typical method changes the input color values. Thus, the other typical method reduces the consumption of the toner.

SUMMARY

An image forming apparatus according to one aspect of the disclosure prints using a color material by an amount according to an output color value converted from an input color value. The image forming apparatus includes a control unit that has at least one specified operation mode and a reduction mode. The control unit that has at least one specified operation mode and a reduction mode. The reduction mode uses a reduced consumption of the color material compared with the operation mode. The control unit compresses a color gamut of the input color value by a reduction rule when the reduction mode is selected. The reduction rule reduces the consumption of the color material. The reduction rule includes a rule of conversion configured to, in a constant hue plane of the input color value, move all color values on a straight line passing through a lowest brightness color value and the input color value in a direction from a highest saturation color value to a highest brightness color value, so as to convert into color values on a straight line passing through the lowest brightness color value and a converted input color value where the input color value is converted. The lowest brightness color value is indicative of a color value of lowest brightness. The highest saturation color value is indicative of a color value of highest saturation. The highest brightness color value is indicative of a color value of highest brightness.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIGS. 11A to 11C illustrate an example of output color values with respect to input color values in the MFP illustrated in FIG. 1;

FIGS. 15A to 15C illustrate an example of output color values with respect to input color values in the conventional image forming apparatus.

DETAILED DESCRIPTION

Figure 1:
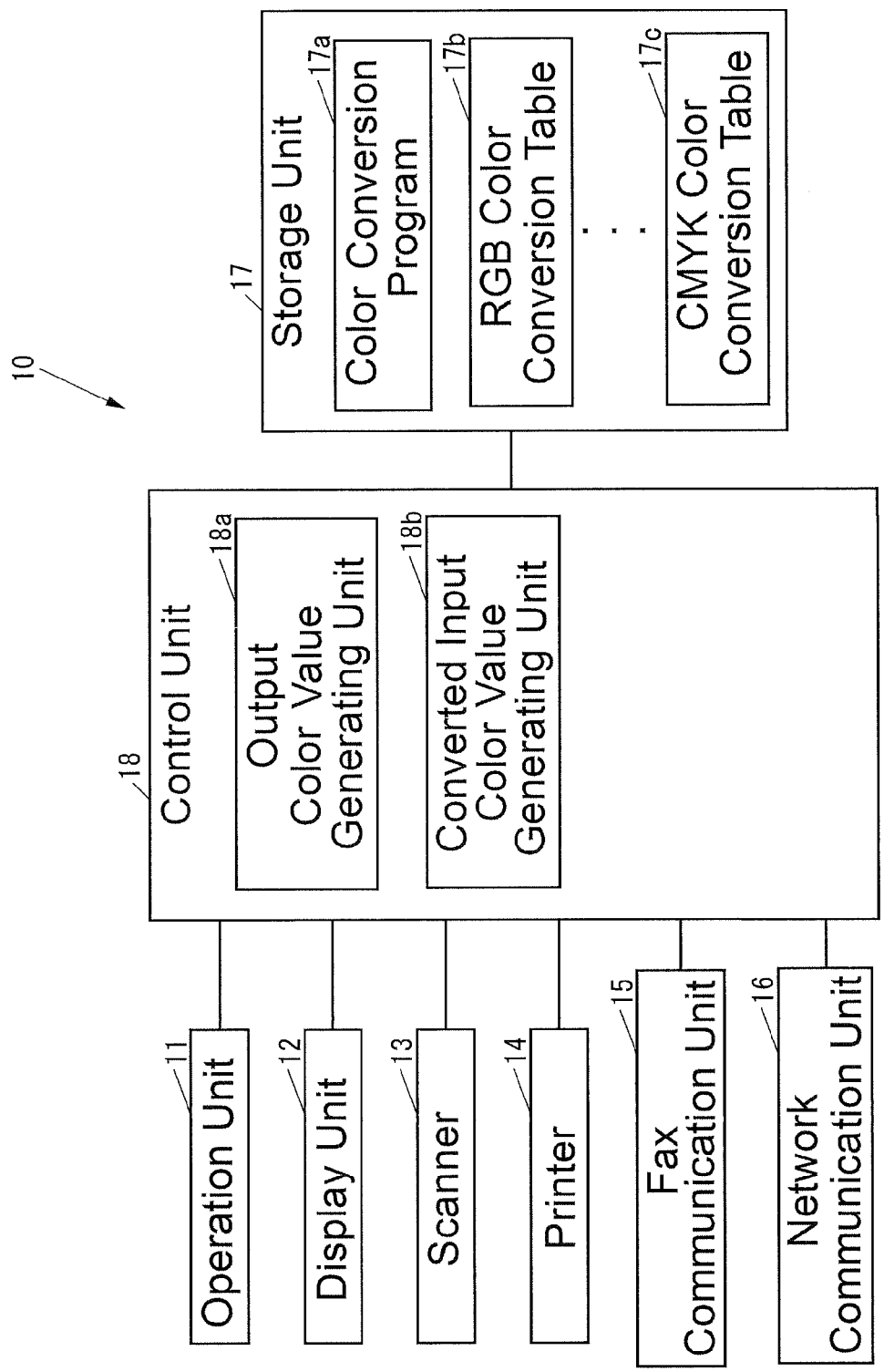
FIG. 1 illustrates a block configuration of an MFP according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereinafter, embodiments of the disclosure will be described with reference to the attached drawings in the following order.

Figure 14A:
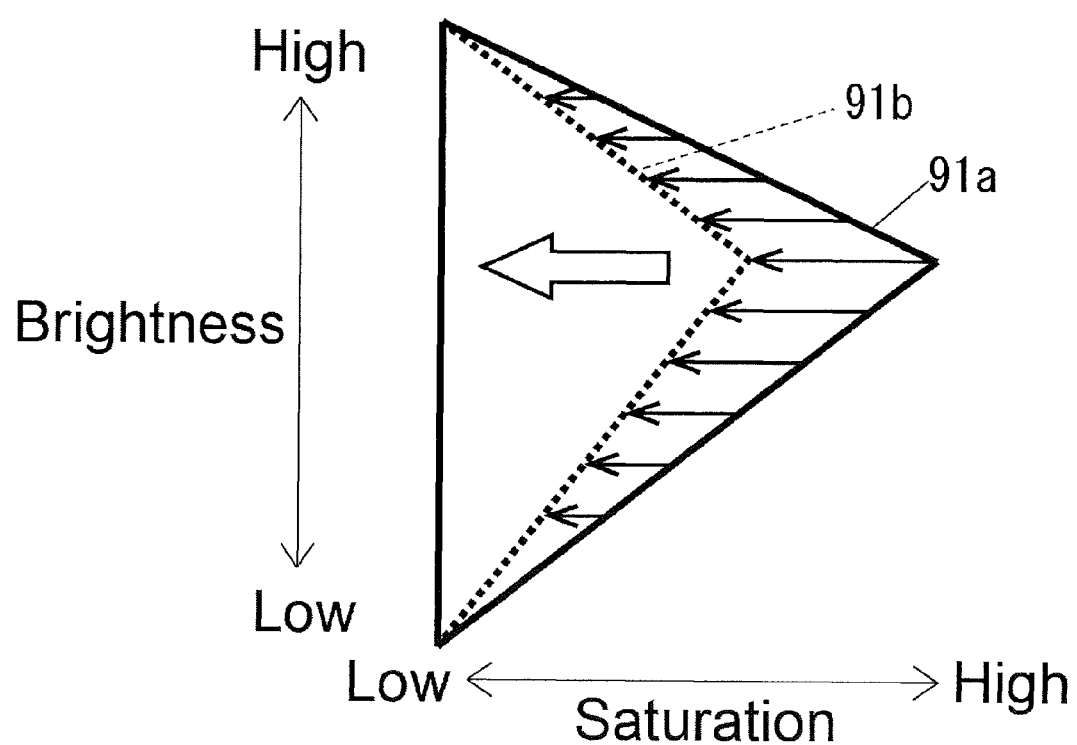
FIGS. 14A to 14C illustrate a compression method of a color gamut of input color values in a conventional image forming apparatus.
Figure 14B:
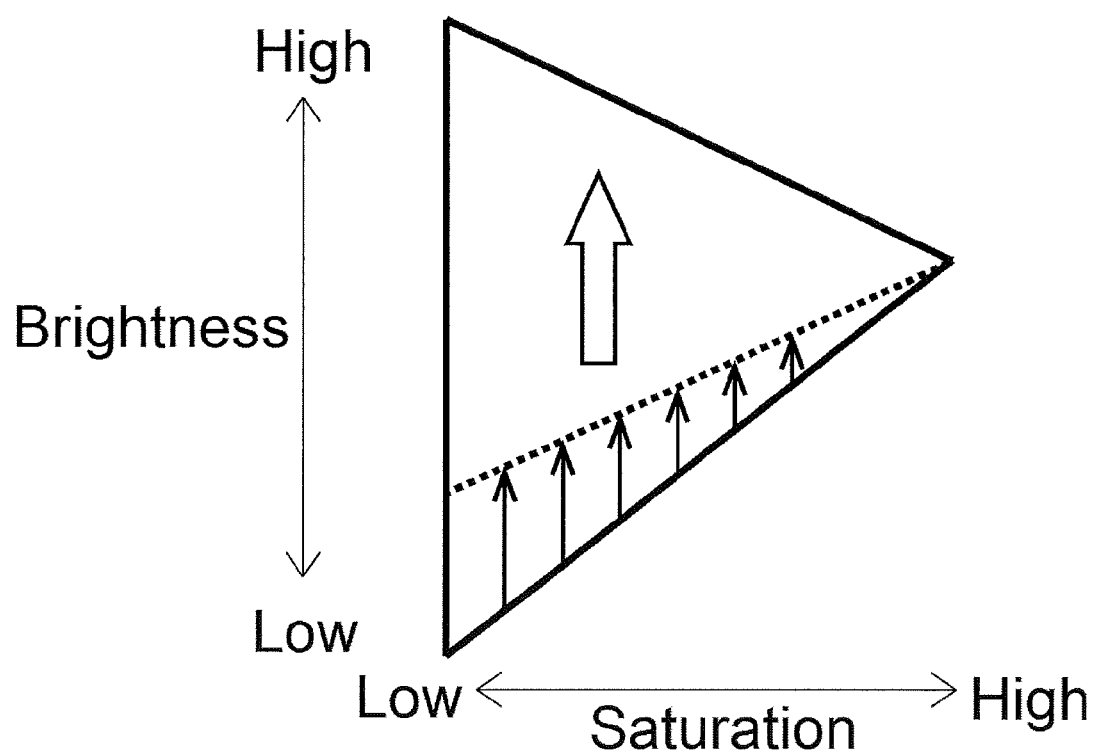
Figure 14C:
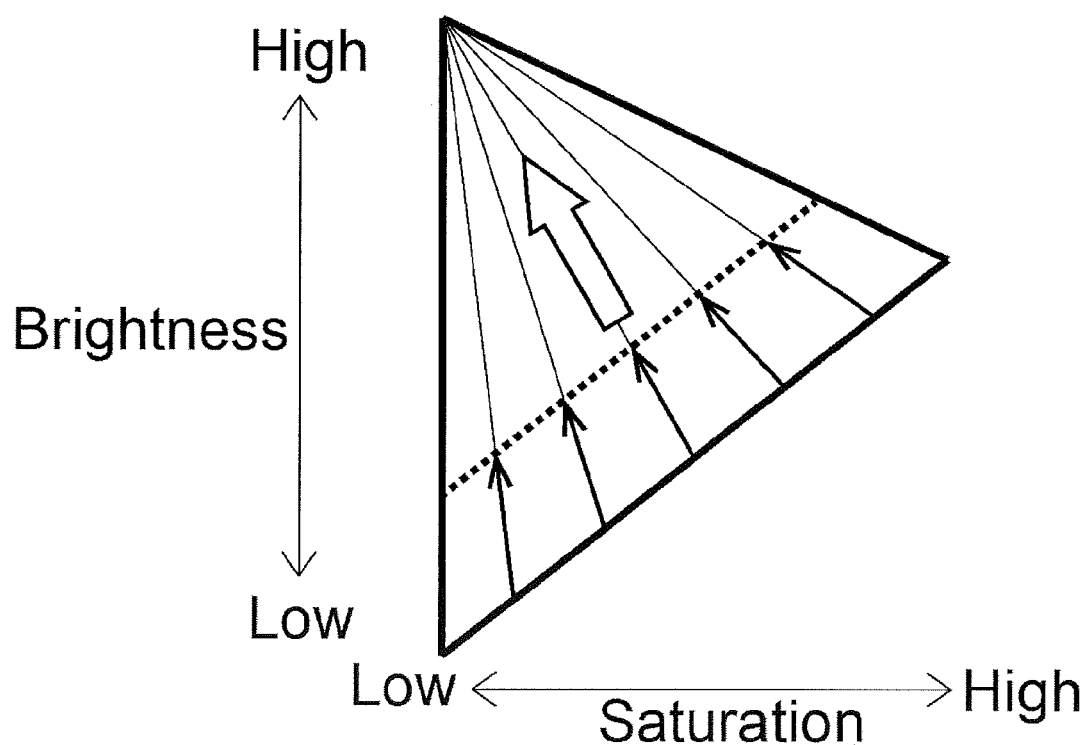

A. Analyses and problems of a gamma-control type reduction method and an input color value change type reduction method performed by the inventor of the disclosure:
B. First embodiment:
C. Second embodiment:
D. Third embodiment:

A. Analyses and Problems of a Gamma-Control Type Reduction Method and an Input Color Value Change Type Reduction Method Performed by the Inventor of the Disclosure The input color value change type reduction method as one example will be described with reference to FIGS. 14A to 14C. FIGS. 14A to 14C each illustrates a constant hue plane of input color values. Arrows in FIGS. 14A to 14C denote a direction of a color gamut compression. Dashed lines denote a boundary line after compression of the color gamut.

FIG. 14A illustrates an input color value change type reduction method (hereinafter referred to as a "saturation change type reduction method"). The saturation change type reduction method reduces consumption of toner by more greatly decreasing only saturation of the input color values as the saturation becomes higher. FIG. 14B illustrates an input color value change type reduction method (hereinafter referred to as a "brightness change type reduction method"). The brightness change type reduction method reduces the consumption of the toner by more greatly increasing only brightness of the input color values as the brightness becomes lower. FIG. 14C illustrates an input color value change type reduction method (hereinafter referred to as a "white color direction change type reduction method"). The white color direction change type reduction method reduces the consumption of the toner by moving the input color values in a part having higher saturation and the input color values in a part having lower brightness toward a white color.

FIGS. 15A to 15C each illustrates an example of output color values with respect to the input color values.

In FIGS. 15A to 15C, an R value, a G value, and a B value of RGB value as the input color value each have brightness of a minimum value of 0 and a maximum value of 1.

A C value, an M value, a Y value, and a K value of CMYK value as the output color value each indicate amounts of toner used for printing, namely print densities. In FIGS. 15A to 15C, the C value, the M value, the Y value, and the K value each have densities of a minimum value of 0 and a maximum value of 255.

Lab values as the output color values are obtained by converting the CMYK values as the output color values into the device-independent Lab values. In FIGS. 15A to 15C, an L value of the Lab value has a minimum value of 0 and a maximum value of 100.

In FIGS. 15A to 15C, an identification sign a1 indicates the color values when an image forming apparatus is in a normal mode. An identification sign a2 indicates the color values with respect to those of the identification sign a1 when the image forming apparatus is in a reduction mode by a gamma-control type reduction method. The gamma-control type reduction method compresses each of the C value, the M value, the Y value, and the K value of the CMYK value as the output color value to 75% of the corresponding value in the normal mode. An identification sign a3 indicates the color values with respect to those of the identification sign a1 when the image forming apparatus is in a reduction mode by a white color direction change type reduction method. The white color direction change type reduction method compresses the color gamut of the input color value to 75% of the corresponding value in the normal mode. The similar relationships among the identification signs a1, a2, and a3 are found in each of the relationships among identification signs b1, b2, and b3; and the relationships among identification signs c1, c2, and c3.

FIG. 15A illustrates the color values when the RGB value as the input color value is (4/5, 4/5, 0). FIG. 15B illustrates the color values when the RGB value as the input color value is (0, 4/5, 4/5). FIG. 15C illustrates the color values when the RGB value as the input color value is (1/8, 1/8, 1/8).

In FIGS. 15A to 15C, the input color values of the identification signs a2, b2, and c2 are identical to those in the normal mode, which are not specially illustrated. In FIGS. 15A to 15C, the input color values of the identification signs a3, b3, and c3 indicate the input color values after compression of the color gamut.

The gamma-control type reduction method causes a problem that a balance of color composed of at least two kinds of color among cyan, magenta, yellow, and black may be lost.

A description will be specifically given below with reference to FIG. 16.

Figure 16:
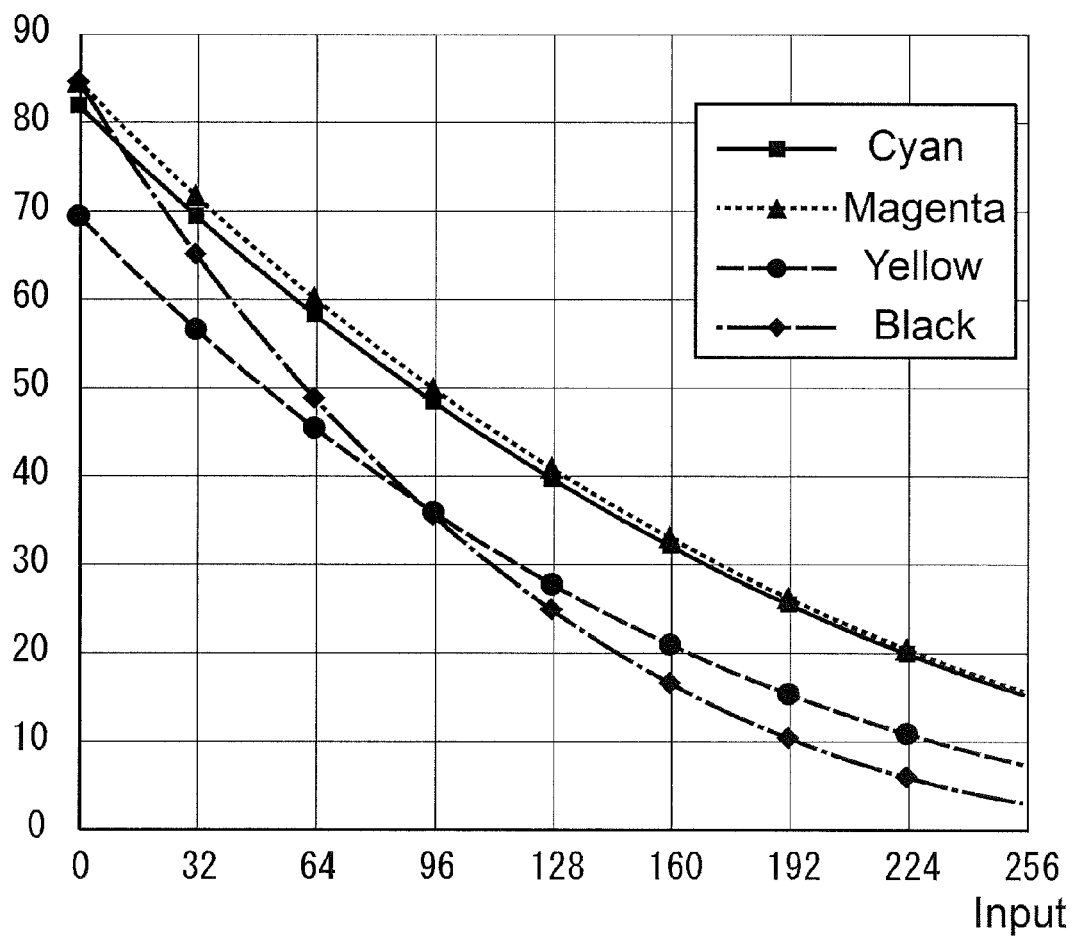
FIG. 16 illustrates one-dimensional input-output property of respective toner of cyan, magenta, yellow, and black in an image forming apparatus as one example.

FIG. 16 illustrates one-dimensional input-output property of the respective toner of cyan, magenta, yellow, and black.

In FIG. 16, inputs of cyan, magenta, yellow, and black indicate the C value, the M value, the Y value, and the K value of the CMYK value, respectively. Outputs of cyan, magenta, yellow, and black define X value, Y value, Z value, and Y value of XYZ value as feature value, respectively.

As illustrated in FIG. 16, the one-dimensional input-output property of the respective toner of cyan, magenta, yellow, and black are plotted as different curved lines with one another rather than straight lines. Accordingly, even if the C value, the M value, the Y value, and the K value of the CMYK value are compressed by an identical ratio, the X value, the Y value, the Z value, and the Y value of the XYZ value as the respective outputs are not compressed by the identical ratio. Therefore, the method to reduce the consumption of the toner, which compresses each C value, M value, Y value, and K value of the CMYK value as the output color values by the identical ratio, may cause a loss of the balance of the color composed of at least two colors among cyan, magenta, yellow, and black.

For example, in FIG. 15A, the RGB value as the input color value is (4/5, 4/5, 0). Accordingly, the Y value is significantly larger in the CMYK value as the output color values when the image forming apparatus is in the normal mode. That is, the print density of yellow toner is significantly higher. In FIG. 15B, the RGB value as the input color value is (0, 4/5, 4/5). Accordingly, the C value is significantly larger in the CMYK value as the output color values when the image forming apparatus is in the normal mode.

That is, the print density of cyan toner is significantly higher. Here, color difference ΔE of the output color values between the identification sign a2 and the identification sign a3 In FIG. 15A is 2.27. In FIG. 15B, the color difference ΔE of the output color values between the identification sign b2 and the identification sign b3 is 1.48. Thus, it is found that, for the color that has the significantly higher print density of the toner for the one kind of color among cyan, magenta, yellow, and black, the color difference ΔE in the output color values does not occur that much even in the reduction mode by the gamma-control type reduction method or even in the reduction mode by the white color direction change type reduction method.

Meanwhile, in FIG. 15C, the RGB value as the input color value is (1/8, 1/8, 1/8). Accordingly, the C value, the M value, the Y value, and the K value of the CMYK value are all larger as the output color values when the image forming apparatus is in the normal mode. That is, the print density of the toner for all colors of cyan, yellow, magenta, and black is higher. Here, the color difference ΔE of the output color values between the identification sign c2 and the identification sign c3 in FIG. 15C, is 7.39. Thus, the color difference ΔE become significantly larger due to the loss of the balance of the color composed of at least two kinds of color among cyan, magenta, yellow, and black, as described above, in the reduction mode by the gamma-control type reduction method.

Therefore, the method to reduce the consumption of the toner without loss of the color balance preferably includes the input color value change type reduction method.

However, a known input color value change type reduction method causes the problems as described below.

First, the problems of the saturation change type reduction method will be described.

As illustrated in FIG. 14A, the saturation change type reduction method does not change the brightness but changes the only saturation. Accordingly, a boundary line 91a as a part having higher brightness is changed to a boundary line 91b within the original color gamut. The boundary line 91a is a boundary line constituted of the color values having the highest saturation in each degree of the brightness among the color values having the equal to or higher brightness than the brightness of the color values having the highest saturation. In other words, the color values on the boundary line 91a as a part having higher brightness move inside the original color gamut. Here, the color to be printed with only the toner for a single color such as cyan, magenta, and yellow is present on the boundary line 91a. Consequently, the reduction of the consumption of the toner by the saturation change type reduction method causes the color values on the boundary line 91a to move inside the original color gamut. This results in that the color to be printed with only the toner for the single color such as cyan, magenta, and yellow is printed with the toner of at least two kinds of color in a mixed state. Users of an image forming apparatus often expect the color to be printed with only the toner for the single color, to be actually printed with only the toner for the single color. Especially, the users' specific expectation for yellow is to be printed with only the yellow toner generally. Therefore, the saturation change type reduction method causes a problem that the color being expected to be printed with only the toner for the single color by the users fails to reproduce as the users expected.

Next, the problems of the brightness change type reduction method will be described.

As illustrated in FIG. 14B, the brightness change type reduction method increases the brightness of the part having lower brightness. Accordingly, a color having the RGB value of (0, 0, 0), namely black color approaches to a white color to turn gray. Therefore, the brightness change type reduction method causes a problem that the object to be printed in black color, such as a black character, is dimmed to be hard to be recognized. Moreover, the problem with the brightness change type reduction method is that it makes it difficult to reduce the consumption of the toner for chromatic colors including cyan, magenta, and yellow although the consumption of the toner for black can be reduced.

Lastly, the problem of the white color direction change type reduction method will be described.

As illustrated in FIG. 14C, similarly to the brightness change type reduction method illustrated in FIG. 14B, the white color direction change type reduction method also increases the brightness of the part having lower brightness, which causes a problem that the object to be printed in black color is dimmed to be hard to be recognized. For example, in FIG. 15C, the K value of the output color values in the reduction mode by the white color direction change type reduction method significantly decreases compared with the K value of the output color values in the normal mode. This is because the black color approaches to the white color to turn gray in the reduction mode by the white color direction change type reduction method.

Therefore, The inventor of the present application provided an image forming apparatus, a color conversion program, and a method of color conversion. They can accurately reproduce the color to be printed with only color material for the single color and the black color in a printed matter even in the reduction of the consumption of the color material.

B. First Embodiment:

First, a configuration of a Multifunction Peripheral (MFP) as an image forming apparatus according to a first embodiment will be described.

FIG. 1 illustrates a block configuration of an MFP 10 according to the embodiment.

As illustrated in FIG. 1, the MFP 10 includes an operation unit 11, a display unit 12, a scanner 13, a printer 14, a fax communication unit 15, a network communication unit 16, a storage unit 17, and a control unit 18. The operation unit 11 is an input device such as a button for inputting various operations. The display unit 12 is a display device such as a Liquid Crystal Display (LCD) that displays various kinds of information. The scanner 13 is a reading device that reads an image from an original document. The printer 14 is a print device that executes a print job on a recording medium such as a paper sheet. The fax communication unit 15 is a fax device that performs fax communication with an external facsimile device (not illustrated) via a communication line such as a dial-up line. The network communication unit 16 is a communication device that communicates with an external device such as a Personal Computer (PC) via the network such as a Local Area Network (LAN) and/or the Internet. The storage unit 17 is a storage device such as an Electrically Erasable Programmable Read Only Memory (EEPROM) and a Hard Disk Drive (HDD) that store various kinds of data. The control unit 18 controls the entire MFP 10.

The printer 14 is a device that performs printing with the toner for cyan, yellow, magenta, and black as a color material.

The storage unit 17 stores a color conversion program 17a for converting the RGB values as the input color values into the CMYK values as the output color values. The color conversion program 17a may be installed on the MFP 10 at production stage of the MFP 10, may be additionally installed on the MFP 10 from a storage medium such as an SD card and a Universal Serial Bus (USB) memory, or may be additionally installed on the MFP 10 via a network.

The storage unit 17 includes an RGB color conversion table 17b as a color conversion table (Lookup Table: LUT) for respective devices. The color conversion table specifies the correspondence relationship between the RGB values as the input color value and the Lab values that are the color values of a CIELAB color space as a device independent color space. For example, the storage unit 17 includes the RGB color conversion table 17b specifying the correspondence relationship between the RGB values of an image displayed by the display unit 12 and the Lab values. The storage unit 17 includes the RGB color conversion table 17b specifying the correspondence relationship between the RGB values of an image read from an original document by the scanner 13 and the Lab values. The storage unit 17 includes the RGB color conversion table 17b specifying the correspondence relationship between the RGB values of an image included in print data received via the network communication unit 16 from an external device and the Lab values.

The storage unit 17 includes a CMYK color conversion table 17c as the color conversion table which specifies the correspondence relationship between the Lab values and the CMYK values as the output color values, for the printer 14.

The control unit 18 includes, for example, a Central Processing Unit (CPU), a Read Only Memory (ROM) that stores the programs and various kinds of data, and a Random Access Memory (RAM) as a main storage device used as a work area of the CPU. The CPU executes the programs stored in the ROM.

The control unit 18 executes the color conversion program 17a stored in the storage unit 17 to function as an output color value generating unit 18a and a converted input color value generating unit 18b. The output color value generating unit 18a converts the color values into the CMYK values as the output color values according to a specific rule to generate the CMYK values as the output color values. The converted input color value generating unit 18b converts the RGB values as the input color values into the RGB values as converted input color values according to a reduction rule for reducing the consumption of the toner to generate the converted input color values.

A method to reduce the consumption of the toner performed by the MFP 10 will be described.

The MFP 10 compresses the color gamut of the RGB values as the input color values, that is, changes the input color values to reduce the consumption of the toner.

Figure 2A:
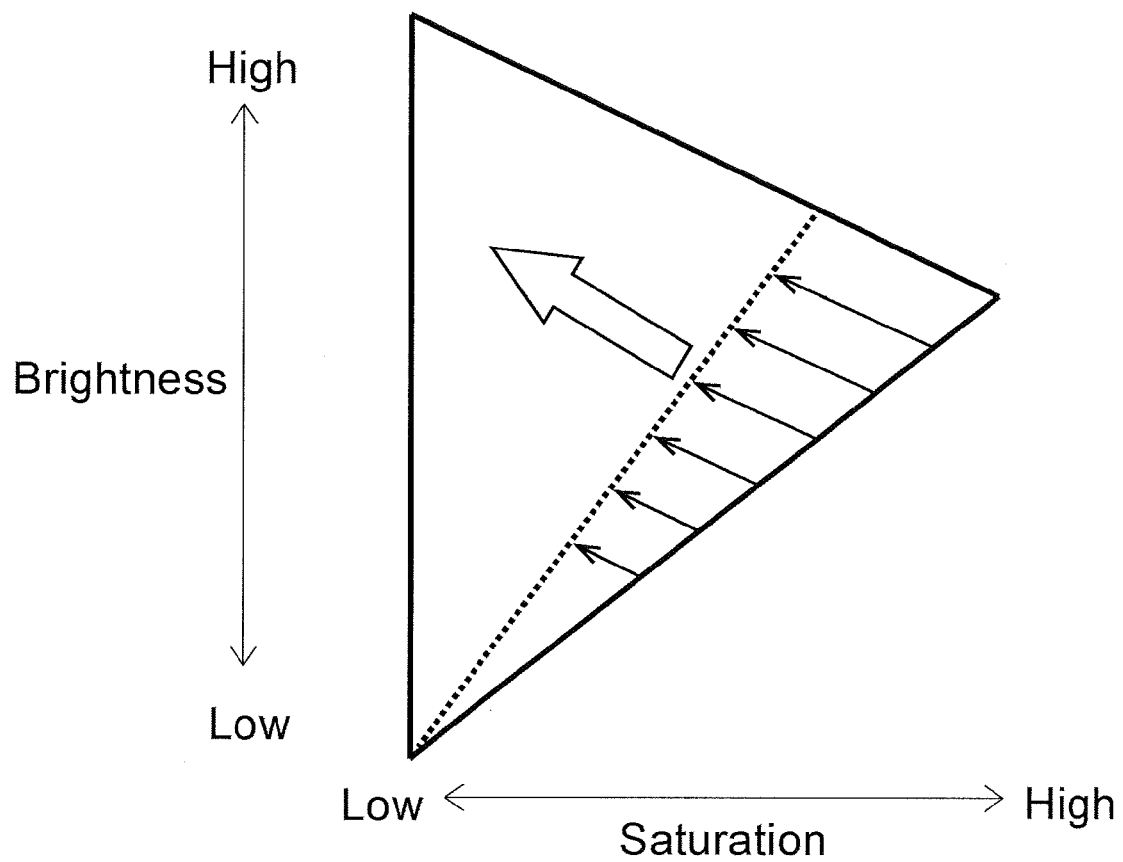
FIG. 2A illustrates a compression method of a color gamut performed by the MFP illustrated in FIG. 1.
Figure 2B:
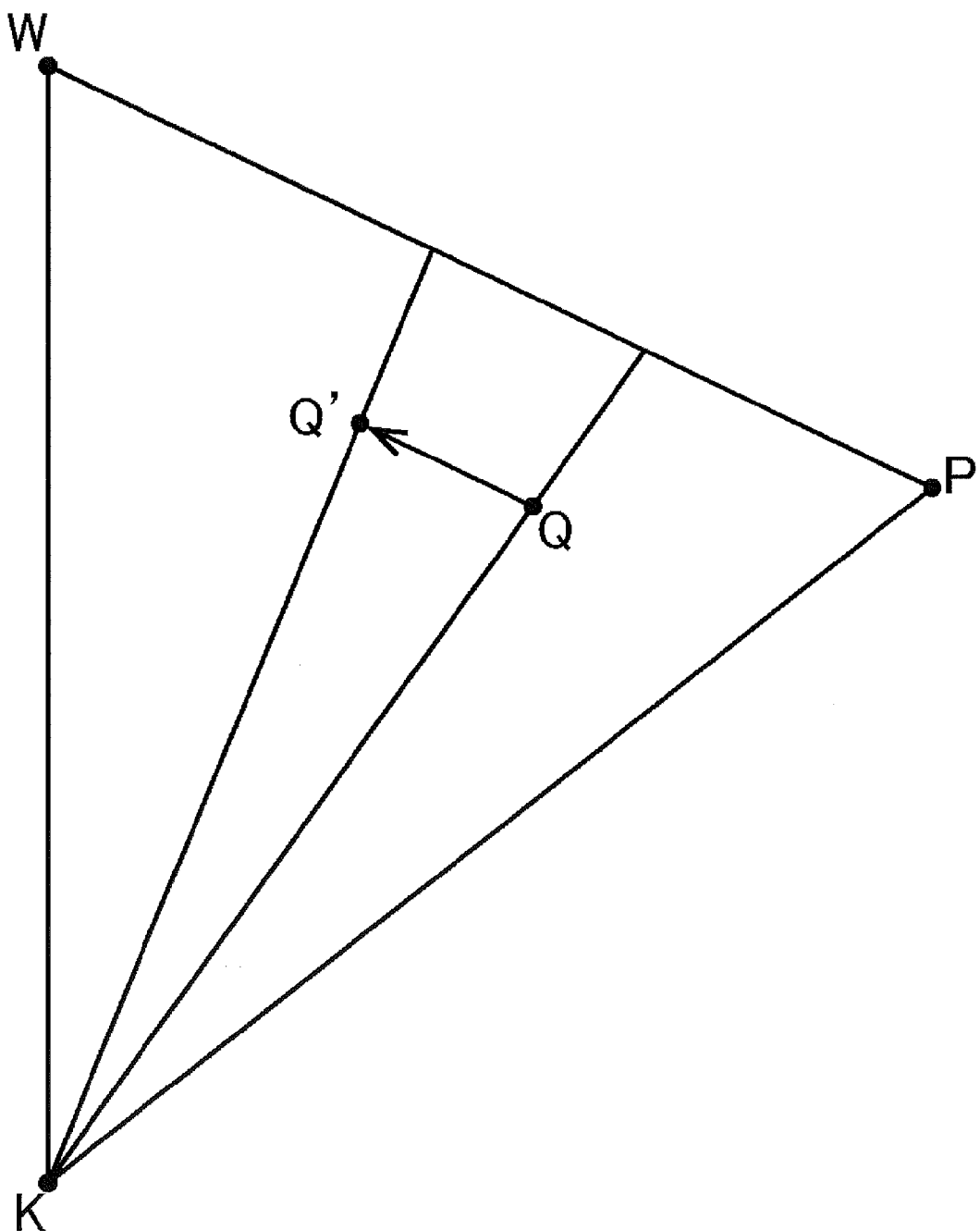
FIG. 2B illustrates a state of focusing on one input color value in the compression method illustrated in FIG. 2A.

FIG. 2A illustrates a compression method of the color gamut performed by the MFP 10. FIG. 2B illustrates a state of focusing on one input color value in the compression method illustrated in FIG. 2A.

FIGS. 2A to 2B illustrate a constant hue plane of the input color values. An arrow in FIG. 2A denotes a direction of color gamut compression. A dashed line denotes a boundary line after the color gamut compression. K and W illustrated in FIG. 2B indicate a black color and a white color, respectively.

As illustrated in FIGS. 2A to 2B, the MFP 10 moves all the color values on a straight line KQ, which passes through a point K as the lowest brightness color value being indicative of the color value of the lowest brightness and a point Q, in a direction from a point P as the highest saturation color value being indicative of the color value of the highest saturation to a point W as the highest brightness color value being indicative of the color value of the highest brightness, that is, a direction indicated with a vector PW to convert into the color value on a straight line KQ' passing through the point K and a point Q' as the converted input color value, in the constant hue plane of the point Q as the input color value.

Next, operations of the MFP 10 will be described.

Figure 3A:
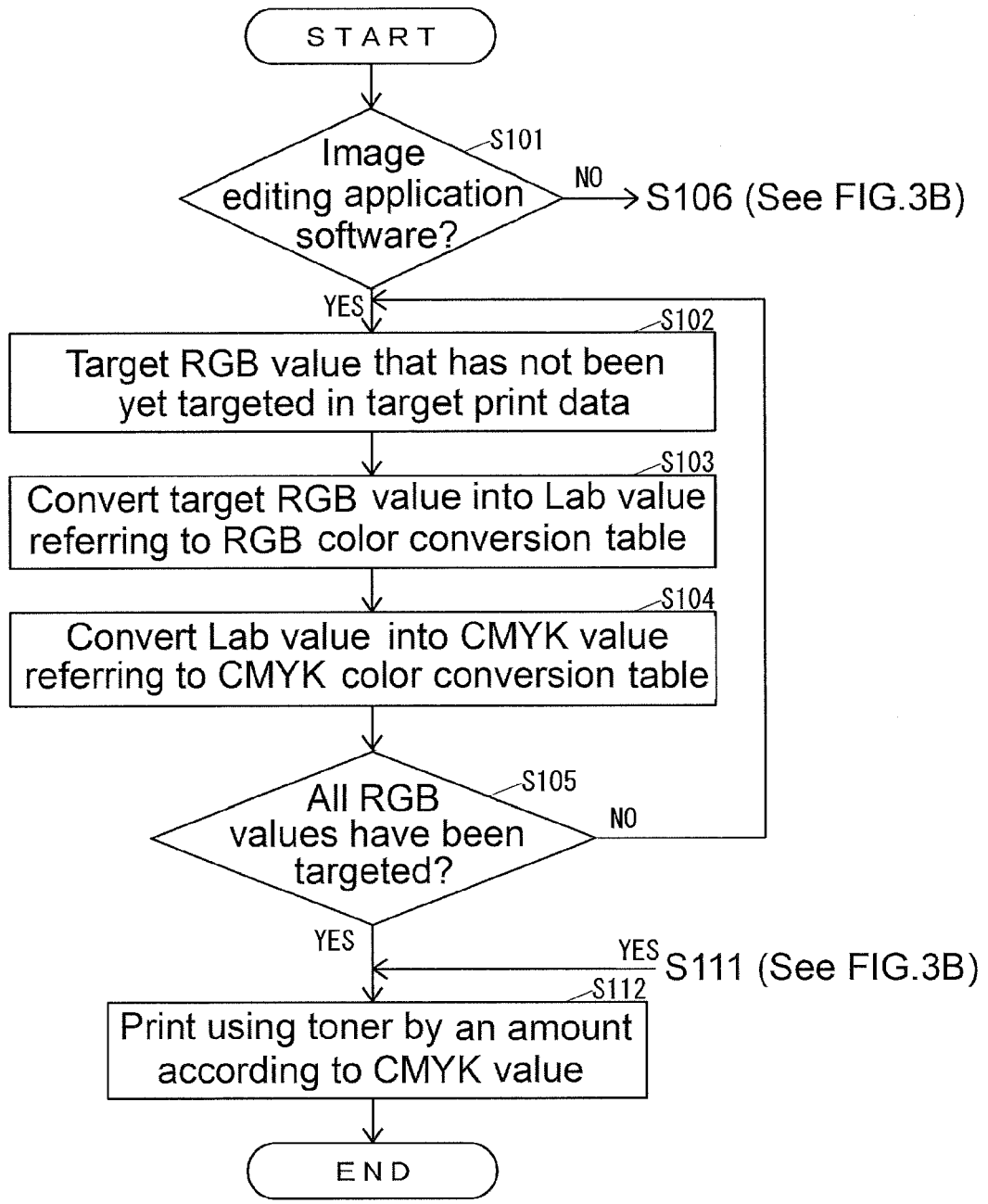
FIGS. 3A and 3B illustrate operations of the MFP illustrated in FIG. 1.
Figure 3B:
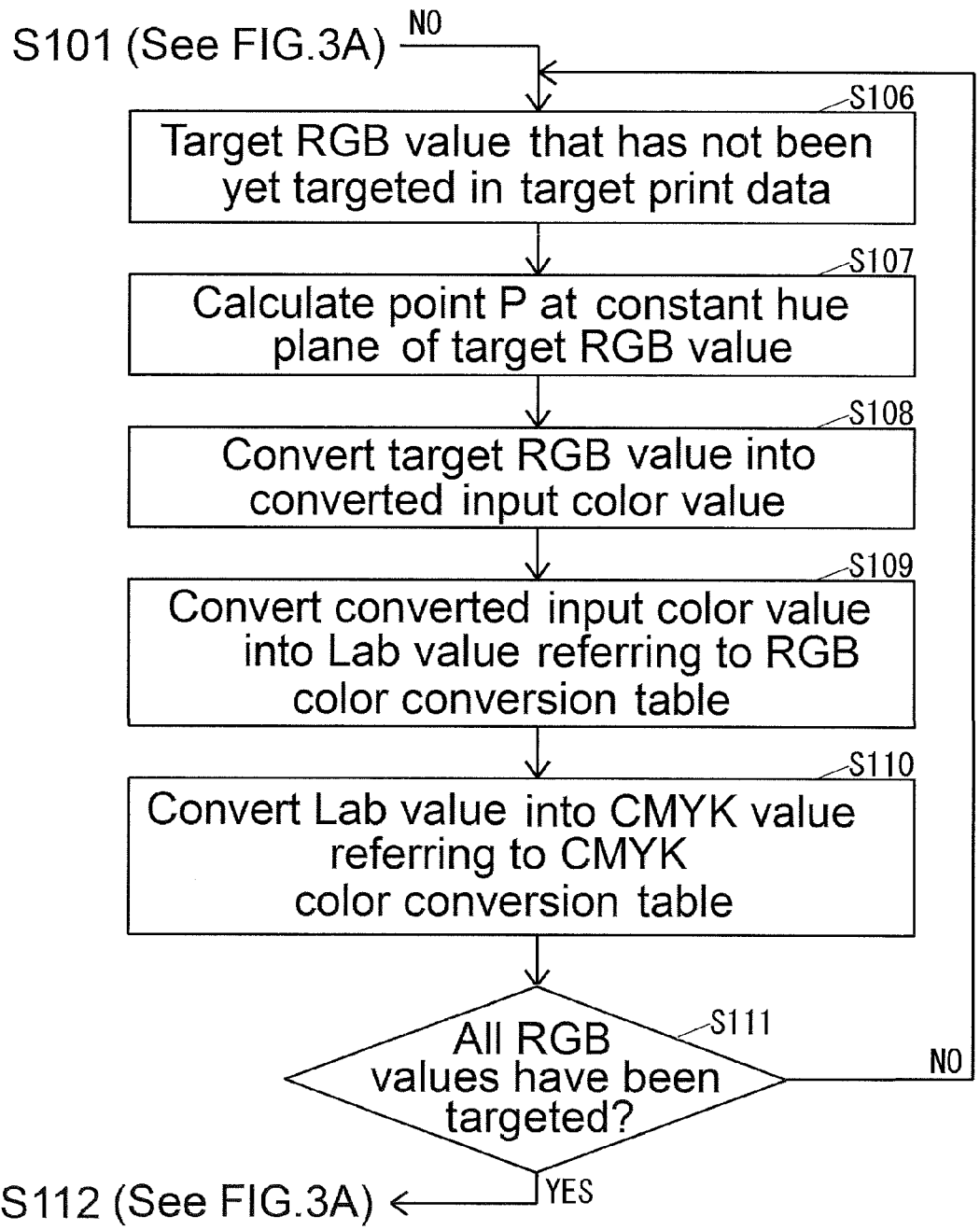

FIGS. 3A and 3B illustrate the operations of the MFP 10.

The MFP 10 performs the operations illustrated in FIGS. 3A and 3B upon reception of the print data via the network communication unit 16 from the external device.

As illustrated in FIG. 3A, the converted input color value generating unit 18b of the MFP 10 determines whether or not application software that generates received print data (hereinafter referred to as "target print data") is image editing application software based on the target print data (Step S101). Here, the type of the application software that has generated the target print data may be included in the target print data as information. The converted input color value generating unit 18b may determine the type of the application software that has generated the target print data, based on an extension of the target print data.

The control unit 18 performs the operations when the MFP 10 is in the normal mode, when the determination in Step S101 is the image editing application software. That is, the control unit 18 performs processes of Step 8102 to Step S105. The normal mode is also referred to simply as an operation mode.

A description will be specifically given below.

First, the output color value generating unit 18a targets one RGB value that has not been yet targeted among the RGB values as the input color values included in the target print data (Step S102).

Next, the output color value generating unit 18a converts the RGB value targeted in Step S102 (hereinafter referred to as a "target RGB value") into a Lab value with reference to the RGB color conversion table 17b (Step S103). Then, the output color value generating unit 18a converts the Lab value generated in Step S103 into a CMYK value as the output color values with reference to the CMYK color conversion table 17c (Step S104). More specifically, the output color value generating unit 18a refers to a specific rule, namely a conversion rule that employs the RGB color conversion table 17b and the CMYK color conversion table 17c to convert the RGB values as the input color values into the CMYK values as the output color values.

Subsequently, the output color value generating unit 18a determines whether or not all the input color values included in the target print data have been targeted (Step S105).

The output color value generating unit 18a performs the process Step S102, when the determination in Step S105 is that all of the input color values included in the target print data have not been targeted.

The control unit 18 performs the operations when the MFP 10 is in the reduction mode that reduces the consumption of the toner by the method illustrated in FIG. 2A or FIG. 2B, when the determination in Step S101 is that the target print data has been generated by not the image editing application software but namely, document application software other than the image editing application software. That is, the control unit 18 performs the processes of Step S106 to Step S111.

A description will be specifically given below.

First, the converted input color value generating unit 18b targets one RGB value that has not been yet targeted among the RGB values as the input color values included in the target print data (Step S106).

Subsequently, the converted input color value generating unit 18b calculates the RGB value of the point P at which the saturation is maximized in the constant hue plane of the RGB value targeted in Step S106, namely the target RGB value (Step S107).

Hereinafter, a calculation method of the RGB value of the point P based on the target RGB value will be specifically described.

Figure 4A:
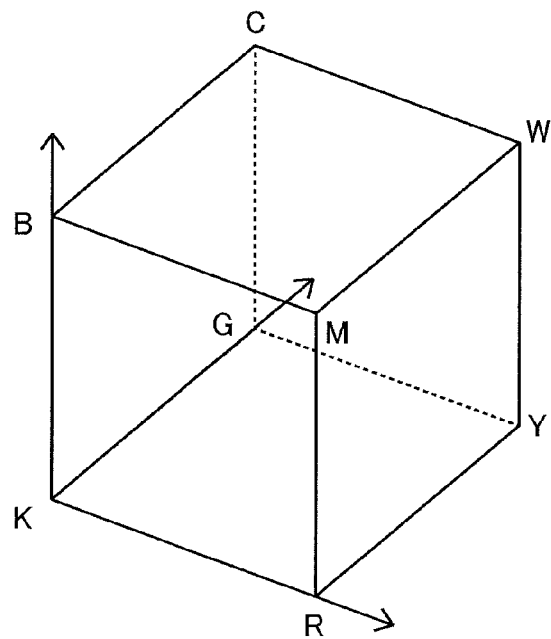
FIG. 4A illustrates an RGB color space in which the input color values in the MFP illustrated in FIG. 1 are arranged.

The RGB values as the input color values are arranged in an RGB color space illustrated in FIG. 4A. Here, in FIGS. 4A to 4B, K, W, R, G, B, C, M, and Y indicate black, white, red, green, blue, cyan, magenta, and yellow, respectively.

Figure 4B:
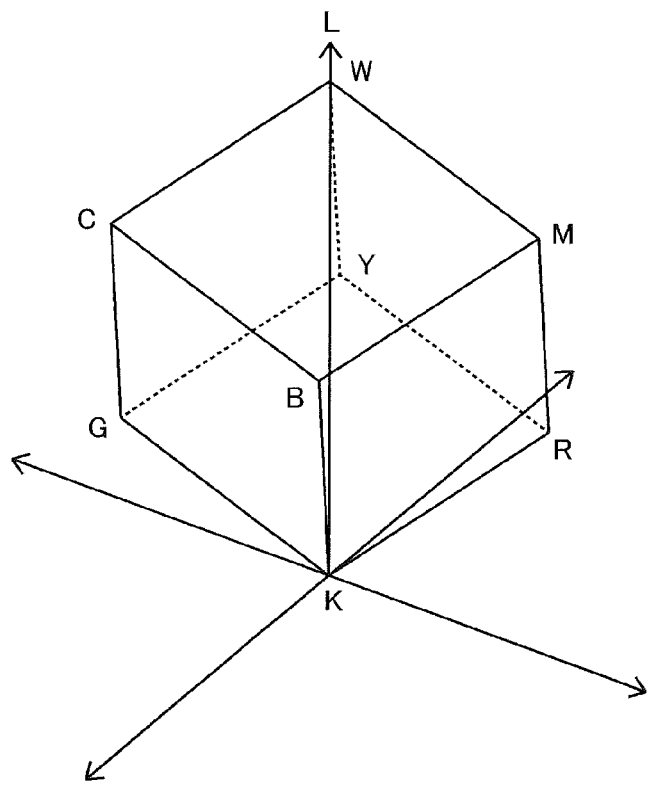
FIG. 4B illustrates the RGB color space illustrated in FIG. 4A using a straight line connecting a black color to a white color as a vertical axis.

FIG. 4B illustrates the RGB color space illustrated in FIG. 4A using a straight line connecting a black color to a white color as a vertical axis. More specifically, an axis L as the vertical axis illustrated in FIG. 4B represents brightness. The minimum and maximum values of the brightness indicate black and white, respectively. In FIG. 4B, a distance from the axis L represents saturation. The saturation becomes higher as the distance from the axis L increases.

Figure 5:
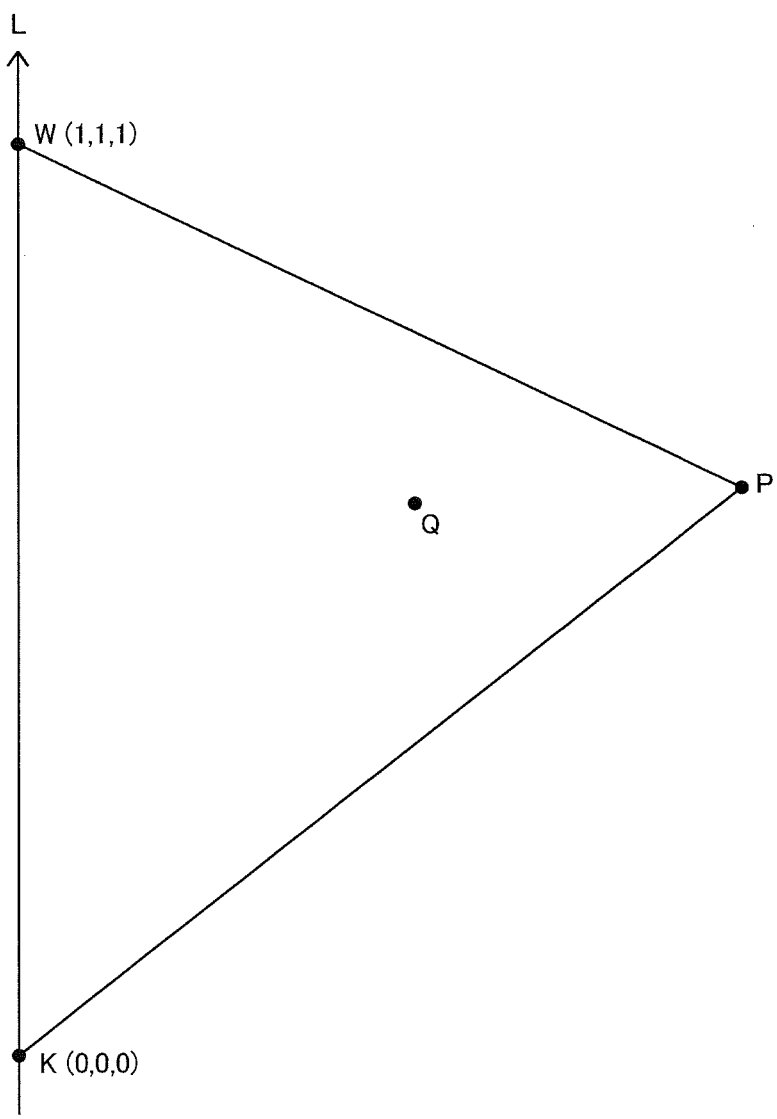
FIG. 5 illustrates a constant hue plane handled in the MFP illustrated in FIG. 1.

The constant hue plane handled in Step S107 is a planar surface on the point Q side with respect to the axis L, as illustrated in FIG. 5, among planar surfaces including the axis L and the point Q as the target RGB value in the RGB color space illustrated in FIG. 4B. The above-described constant hue plane also includes the points on the axis L.

The point K, namely the black color has the RGB value of (0, 0, 0). The point W, namely the white color has the RGB value of (1, 1, 1). Accordingly, formulas shown in Formula 1 and Formula 2 are valid for the point K and the point W, respectively. Similarly, if the point Q has the RGB value of (Qr, Qg, Qb), the formula shown in Formula 3 is valid for the point Q. If the point P has the RGB value of (Pr, Pg, Pb), the formula shown in Formula 4 is valid for the point P.

$$K = \begin{bmatrix} 0 \\ 0 \\ 0 \end{bmatrix}$$ [Formula 1]

$$W = \begin{bmatrix} 1 \\ 1 \\ 1 \end{bmatrix}$$ [Formula 2]

$$Q = \begin{bmatrix} Q_r \\ Q_g \\ Q_b \end{bmatrix}$$ [Formula 3]

$$P = \begin{bmatrix} P_r \\ P_g \\ P_b \end{bmatrix}$$ [Formula 4]

Figure 6:
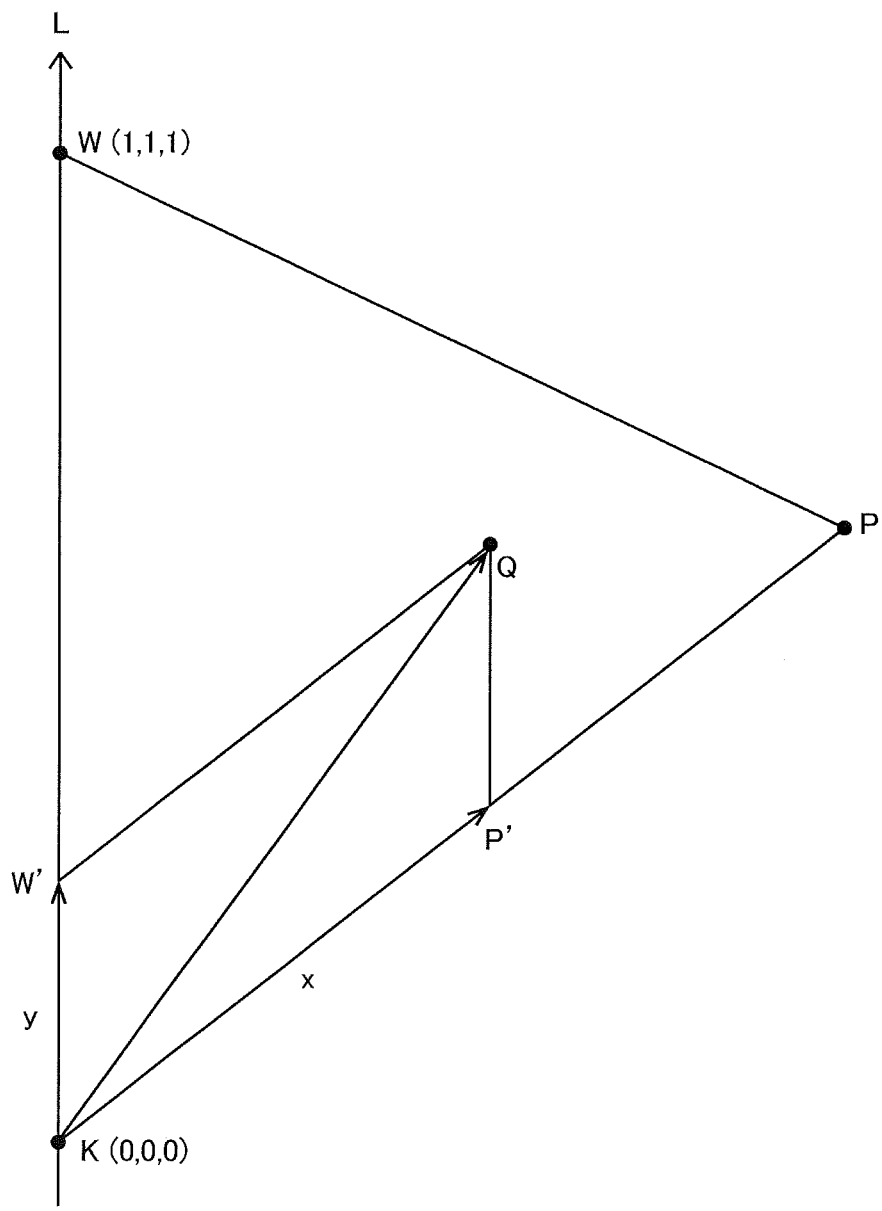
FIG. 6 illustrates a calculation method of the highest saturation color value in the constant hue plane illustrated in FIG. 5.

A vector KQ directed from the point K to the point Q can be represented by the formula shown in Formula 5 with using a vector KP directed from the point K to the point P and a vector KW directed from the point K to the point W, as illustrated in FIG. 6. In the formula shown in Formula 5, a vector KP' is a vector directed from the point K to a point P' on a straight line KP. A vector KW' is a vector directed from the point K to a point W' on a straight line KW. x denotes a ratio of the length of the vector KP' with respect to the vector KP. y denotes a ratio of the length of the vector KW' with respect to the vector KW.

$$\overrightarrow{KQ} = \overrightarrow{KP'} + \overrightarrow{KW'}$$ [Formula 5]

$$= x\overrightarrow{KP} + y\overrightarrow{KW}$$

The formula shown in Formula 6 can be obtained based on the formulas shown in Formulas 1 to 5.

$$\begin{bmatrix} Q_r \\ Q_g \\ Q_b \end{bmatrix} = \begin{bmatrix} xP_r + y \\ xP_g + y \\ xP_b + y \end{bmatrix}$$ [Formula 6]

Figure 7:
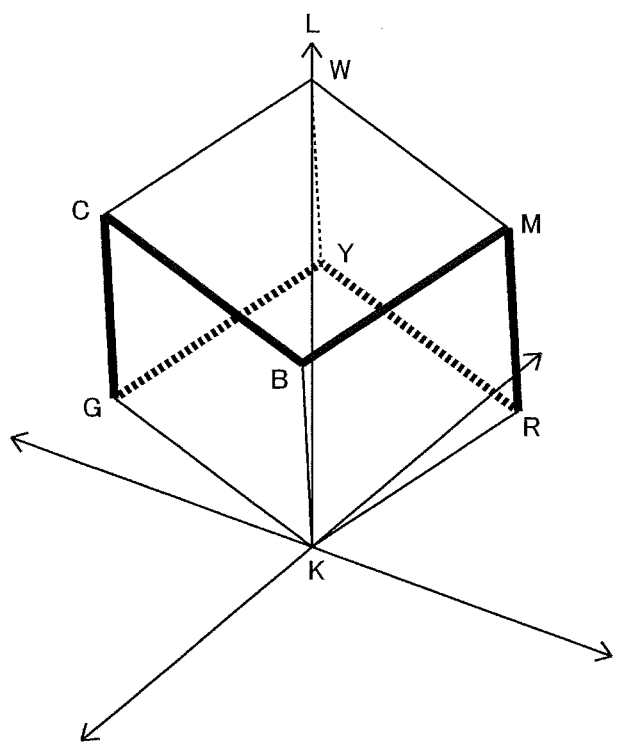
FIG. 7 illustrates positions of the highest saturation color value in the RGB color space illustrated in FIG. 4B.

Here, the point P is any one of the points on a line shown with a thick solid line or a thick dashed line illustrated in FIG. 7. That is, at least any one of the R value, the G value, and the B value of the RGB value of the point P is a minimum value of "0". At least any one of the R value, the G value, and the B value of the RGB value of the point P is a maximum value of "1". The formulas shown in Formula 7 and Formula 8 can be obtained based on this described above and the formula shown in Formula 6. In the formula shown in Formula 7, min (Q) represents a minimum value among the R value, the G value, and the B value of the RGB value of the point Q. In the formula shown in Formula 8, max (Q) represents a maximum value among the R value, the G value, and the B value of the RGB value of the point Q.

$$\min(Q) = y$$ [Formula 7]

$$\max(Q) = x + y$$ [Formula 8]

According to the formulas shown in Formulas 6 to 8, the RGB values of the point Q and the RGB values of the point P have the following relationships (hereinafter referred to as a "correspondence relationship of minimum or maximum values"). That is, when the R value among the R value, the G value, and the B value of the point P is the minimum value, the R value among the R value, the G value, and the B value of the point Q is the minimum value. When the R value among the R value, the G value, and the B value of the point P is the maximum value, the R value among the R value, the G value, and the B value of the point Q is the maximum value. The R value has been described, and the same applies to the G value and the B value.

The formula shown in Formula 9 can be obtained based on the formulas shown in Formulas 5, 7, and 8.

$$\overrightarrow{KP} = \frac{1}{x}(\overrightarrow{KQ} - y\overrightarrow{KW})$$ [Formula 9]

$$= \frac{1}{\max(Q) - \min(Q)}\{\overrightarrow{KQ} - \min(Q)\overrightarrow{KW}\}$$

Then, the formula shown in Formula 10 can be obtained based on the formulas shown in Formulas 1 to 4, and Formula 9.

$$\begin{bmatrix} P_r \\ P_g \\ P_b \end{bmatrix} = \frac{1}{\max(Q) - \min(Q)} \begin{bmatrix} Q_r - \min(Q) \\ Q_g - \min(Q) \\ Q_b - \min(Q) \end{bmatrix}$$ [Formula 10]

As described above, the converted input color value generating unit 18b can calculate the RGB value of the point P from the target RGB value based on the formula shown in Formula 10.

As illustrated in FIG. 3B, the converted input color value generating unit 18b, after the process of Step S107, refers to the reduction rule to convert the target RGB value into the converted input color value (Step S108).

Hereinafter, a calculation method of the converted input color value based on the target RGB value will be specifically described.

Figure 8:
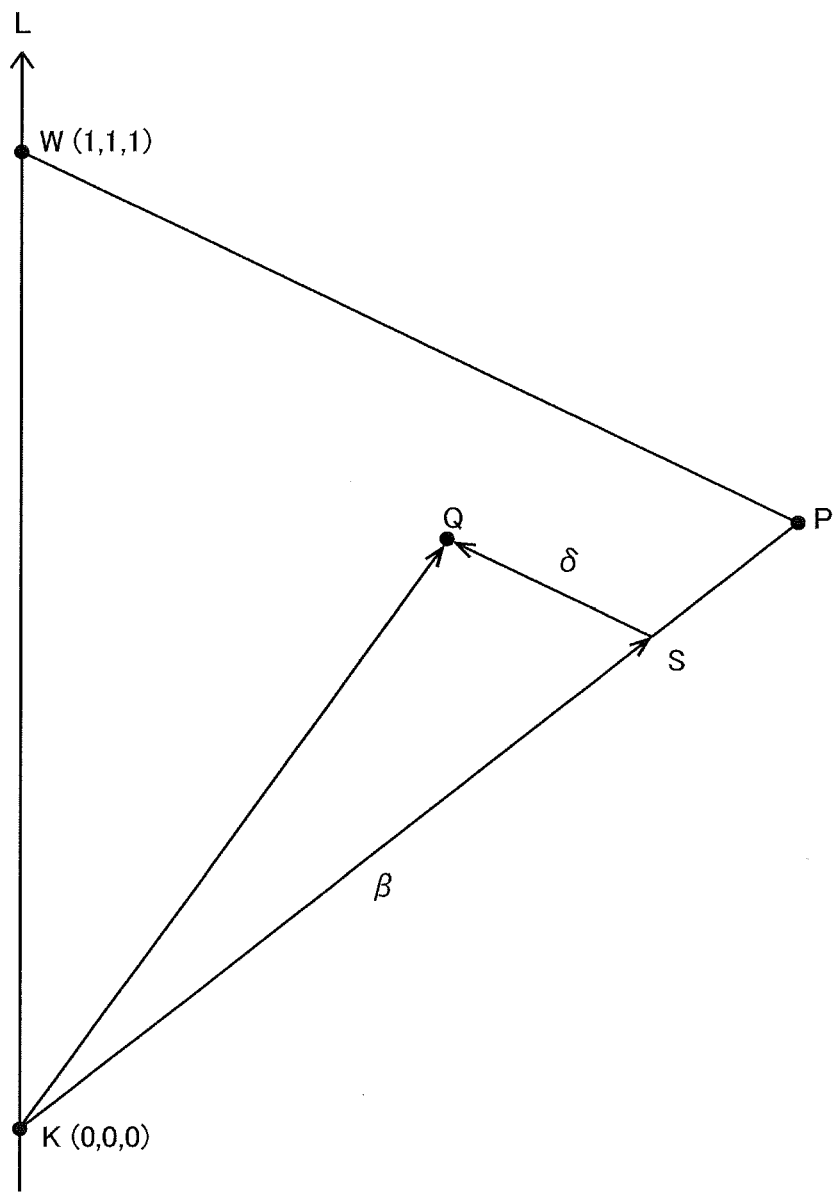
FIG. 8 illustrates one process in a calculation method of converted input color values in the constant hue plane illustrated in FIG. 5.

The vector KQ directed from the point K to the point Q can be also represented by the formula shown in Formula 11 with using the vector KP directed from the point K to the point P and the vector PW directed from the point P to the point W, as illustrated in FIG. 8. In the formula shown in Formula 11, a vector KS is a vector directed from the point K to a point S on the straight line KP, which has the identical direction as the vector KP. A vector SQ is a vector directed from the point S to the point Q. $\beta$ denotes a ratio of the length of the vector KS with respect to the vector KR. $\delta$ denotes a ratio of the length of the vector SQ with respect to the vector PW.

$$\overrightarrow{KQ} = \overrightarrow{KS} + \overrightarrow{SQ} \quad \text{[Formula 11]}$$
$$= \beta \overrightarrow{KP} + \delta \overrightarrow{PW}$$

The formula shown in Formula 12 can be obtained based on the formulas shown in Formulas 1 to 4, and Formula 11.

$$\begin{bmatrix} Q_r \\ Q_g \\ Q_b \end{bmatrix} = \beta \begin{bmatrix} P_r \\ P_g \\ P_b \end{bmatrix} + \delta \begin{bmatrix} 1 - P_r \\ 1 - P_g \\ 1 - P_b \end{bmatrix} \quad \text{[Formula 12]}$$

The formulas shown in Formula 13 and Formula 14 can be obtained based on the following: as described above, at least any one of the R value, the G value, and the B value of the RGB value of the point P is the minimum value of "0", and at least any one of the R value, the G value, and the B value of the RGB value of the point P is the maximum value of "1"; the above-described correspondence relationship of minimum or maximum values; and the formula shown in Formula 12.

$$\min(Q) = \delta \quad \text{[Formula 13]}$$

$$\max(Q) = \beta \quad \text{[Formula 14]}$$

Figure 9:
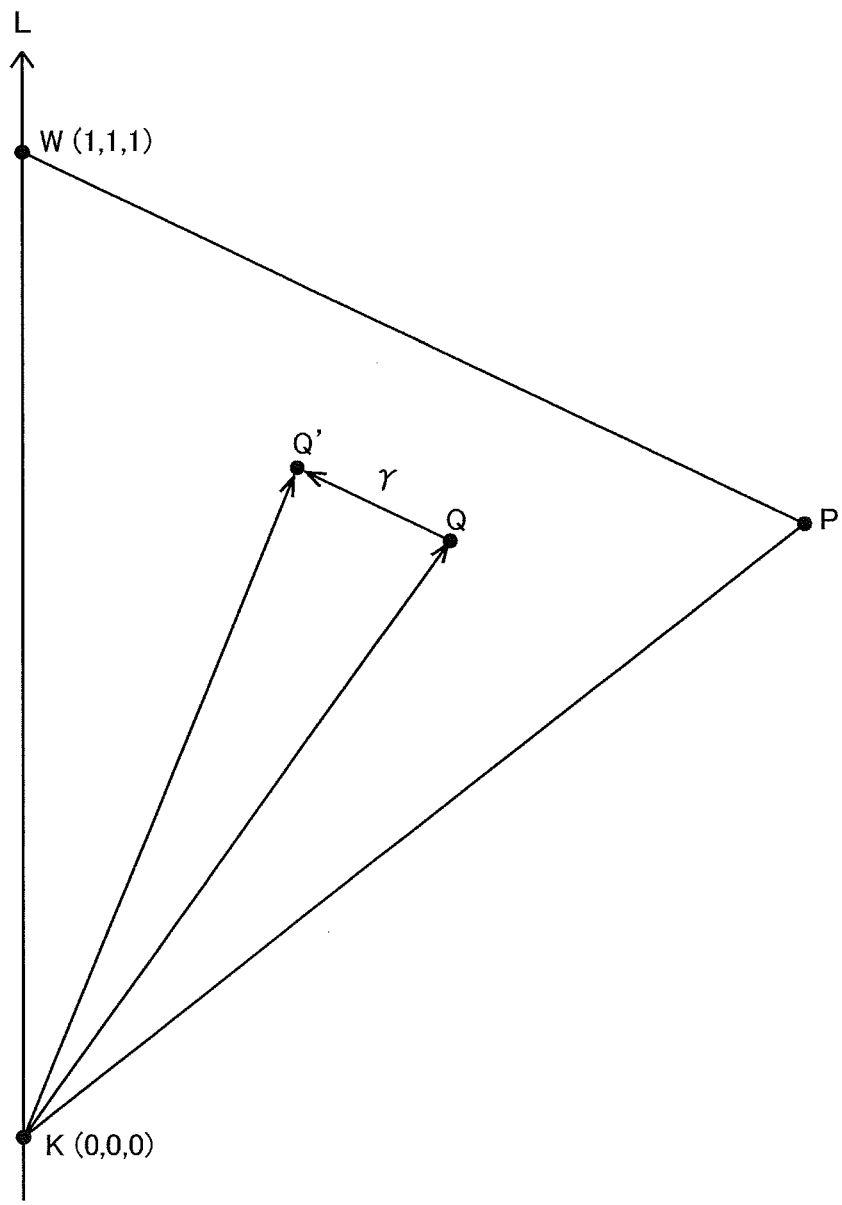
FIG. 9 illustrates one process, which differs from that of FIG. 8, in a calculation method of converted input color values in the constant hue plane illustrated in FIG. 5.

A vector KQ' directed from the point K to the point Q' as the converted input color values can be represented by the formula shown in Formula 15 with using the vector KQ, the vector KW, and the vector KP, as illustrated in FIG. 9. In the formula shown in Formula 15, $\gamma$ denotes a ratio of the length of a vector QQ' directed from the point Q to the point Q' with respect to the vector PW.

$$\overrightarrow{KQ'} = \overrightarrow{KQ} + \overrightarrow{QQ'} \quad \text{[Formula 15]}$$
$$= \overrightarrow{KQ} + \gamma \overrightarrow{PW}$$
$$= \overrightarrow{KQ} + \gamma (\overrightarrow{KW} - \overrightarrow{KP})$$

Figure 10:
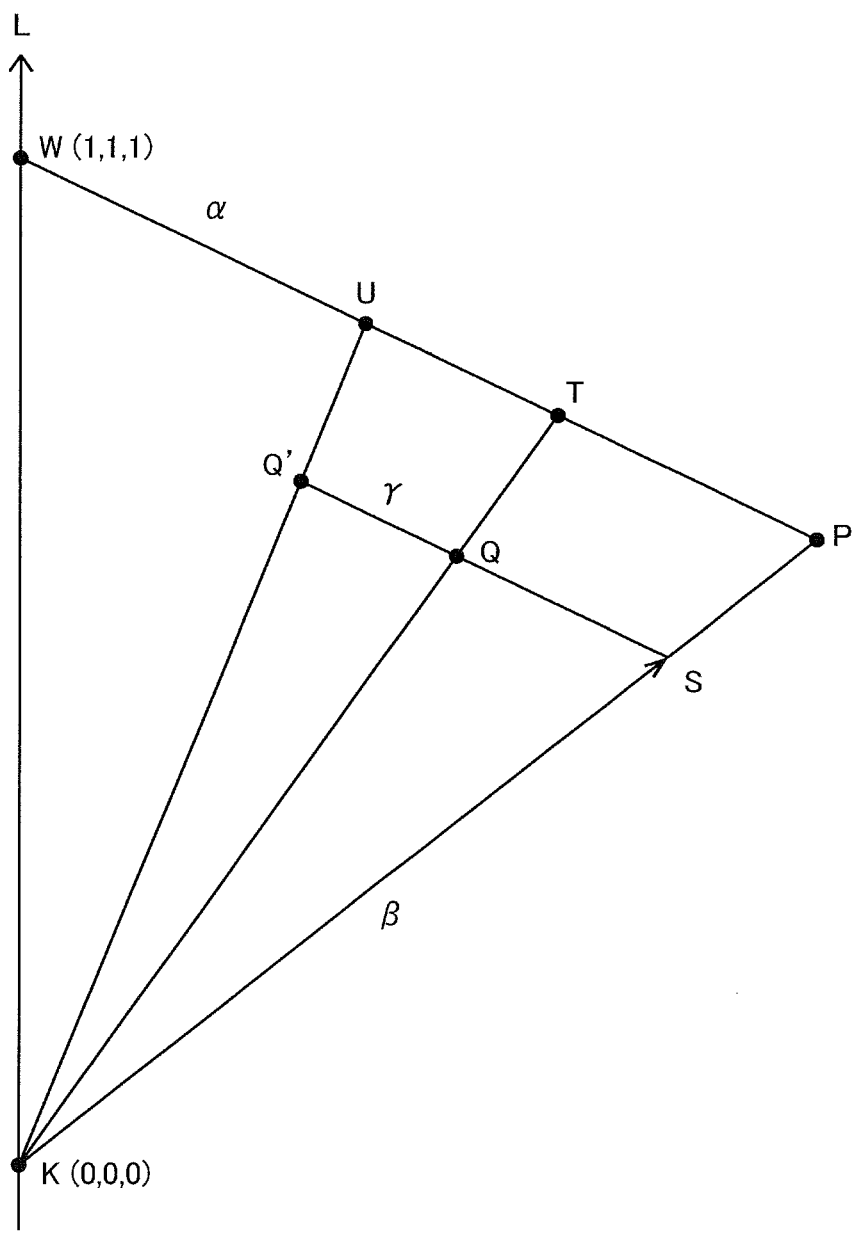
FIG. 10 illustrates one process, which differs from those of FIG. 8 and FIG. 9, in a calculation method of converted input color values in the constant hue plane illustrated in FIG. 5.

As illustrated in FIG. 10, the vector UW is represented by the formula shown in Formula 16, when a ratio of the length of a vector UW with respect to a vector TW is $\alpha$. The vector TW is a vector directed from a point T to the point W. The vector UW is a vector directed from a point U to the point W. Accordingly, the formula shown in Formula 16, with use of a vector KU directed from the point K to the point U, a vector KT directed from the point K to the point T, and the vector KW, is represented by the formula shown in Formula 17. Here, the point T is a point of intersection of the straight line KQ and a straight line PW. The point U is a point of intersection of the straight line KQ'' and the straight line PW. Additionally, the relationships of $\Delta KSQ \infty \Delta KPT$ and $\Delta KQQ' \infty \Delta KTU$ are established. Therefore, the formula shown in Formula 17, with use of the vector KQ, the vector KQ', and $\beta$, is represented by the formula shown in Formula 18. Consequently, the vector KQ' is represented by the formula shown in Formula 19.

$$\overrightarrow{UW} = \alpha \overrightarrow{TW} \quad \text{[Formula 16]}$$

$$\overrightarrow{KW} - \overrightarrow{KU} = \alpha(\overrightarrow{KW} - \overrightarrow{KT}) \quad \text{[Formula 17]}$$

$$\overrightarrow{KW} - \frac{1}{\beta}\overrightarrow{KQ'} = \alpha\left(\overrightarrow{KW} - \frac{1}{\beta}\overrightarrow{KQ}\right) \quad \text{[Formula 18]}$$

$$\overrightarrow{KQ'} = \alpha \overrightarrow{KQ} + \beta(1 - \alpha)\overrightarrow{KW} \quad \text{[Formula 19]}$$

Then, the formula shown in Formula 20 can be obtained based on the formulas shown in Formula 15 and Formula 19. $\gamma$ is represented by the formula shown in Formula 21 based on the formulas shown in Formula 20, Formula 9, and Formula 14. Accordingly, the RGB value of (Q'r, Q'g, Q'b) of the point Q' is represented by the formula shown in Formula 22 based on the formulas shown in Formulas 1 to 4, Formula 15, and Formula 21. That is, the RGB value of the point Q' can be represented by the RGB value of the point Q, the RGB value of the point P, and $\alpha$.

$$\overrightarrow{KQ} + \gamma(\overrightarrow{KW} - \overrightarrow{KP}) = \alpha \overrightarrow{KQ} + \beta(1 - \alpha)\overrightarrow{KW} \quad \text{[Formula 20]}$$

$$\gamma = (1 - \alpha)\{\max(Q) - \min(Q)\} \quad \text{[Formula 21]}$$

$$\overrightarrow{KQ'} = \begin{bmatrix} Q'_r \\ Q'_g \\ Q'_b \end{bmatrix} \quad \text{[Formula 22]}$$
$$= \begin{bmatrix} Q_r \\ Q_g \\ Q_b \end{bmatrix} + (1 - \alpha)\{\max(Q) - \min(Q)\}\begin{bmatrix} 1 - P_r \\ 1 - P_g \\ 1 - P_b \end{bmatrix}$$

As described above, the converted input color value generating unit 18b can calculate the RGB value as the converted input color values from the target RGB value, $\alpha$ and, the RGB value of the point P calculated in Step S107 based on the formula shown in Formula 22. Here, $\alpha$ denotes a compression ratio of the color gamut of the input color values.

As illustrated in FIG. 3B, the output color value generating unit 18a, after the process of Step S108, converts the RGB values as the converted input color values generated in Step S108 into the Lab values with reference to the RGB color conversion table 17b identical with the RGB color conversion table 17b used in Step S103 (Step S109). Subsequently, the output color value generating unit 18a converts the Lab values generated in Step S109 into the CMYK values as the output color values with reference to the CMYK color conversion table 17c identical with the CMYK color conversion table 17c used in Step S104 (Step S110). More specifically, the output color value generating unit 18a refers to a specific rule, namely a conversion rule that employs the RGB color conversion table 17b and the CMYK color conversion table 17c to convert the RGB values as the converted input color values into the CMYK values as the output color values.

Subsequently, the output color value generating unit 18a determines whether or not all the input color values included in the target print data have been targeted (Step S111).

The converted input color value generating unit 18b performs the process of Step S106, when the determination in Step S111 is that all of the input color values included in the target print data have not been targeted.

The control unit 18 causes the printer 14 to perform printing using the toner by an amount according to the CMYK value generated in Step S104 or Step S110 (Step S112) when the determination in Step S105 or Step S111 is that all the input color values included in the target print data have been targeted. And then, the control unit 18 terminates the operations illustrated in FIGS. 3A and 3B.

FIGS. 11A to 11C each illustrate examples of the output color values with respect to the input color values when the MFP 10 is both in the normal mode and in the reduction mode.

In FIGS. 11A to 11C, the R value, the G value, and the B value of the RGB value as the input color value each have brightness of the minimum value of 0 and brightness of the maximum value of 1.

The C value, the M value, the Y value, and the K value of the CMYK value as the output color values each indicate the amounts of toner used for printing, namely the print densities. In FIGS. 11A to 11C, the C value, the M value, the Y value, and the K value each have the densities of a minimum value of 0 and a maximum value of 255.

Lab values as the output color values are obtained by converting the CMYK values as the output color values into the Lab values. In FIGS. 11A to 11C, the L value of the Lab values has a minimum value of 0 and a maximum value of 100.

In FIGS. 11A to 11C, an identification sign a1 indicates the color values when the MFP 10 is in a normal mode. An identification sign a4 indicates the color values with respect to those of the identification sign a1 when the MFP 10 is in the reduction mode that compresses the color gamut of the input color values to 75% of the color gamut in the normal mode by the method illustrated in FIGS. 2A and 2B. The similar relationship between the identification signs a1 and a4 is found in each of the relationships between identification signs b1 and b4, and the relationship between the identification signs c1 and c4.

FIG. 11A illustrates the color values when the RGB value as the input color values is (4/5, 4/5, 0). FIG. 11B illustrates the color values when the RGB value as the input color values is (0, 4/5, 4/5). FIG. 11C illustrates the color values when the RGB value as the input color values is (1/8, 1/8, 1/8).

In FIGS. 11A to 11C, the input color values of the identification signs a4, b4, and c4 indicate the input color values after compression of the color gamut.

As described above, the MFP 10, in the reduction of the consumption of the toner (No in Step S101), converts the point Q as the input color values on the straight line PW, which passes through the point P as the highest saturation color values in the constant hue plane of the input color values and the point W as the highest brightness color values, into the point Q' as the converted input color values on the identical straight line, namely on the straight line PW (Step S108). This ensures that the MFP 10 can accurately reproduce the color to be printed with only the toner for the single color in the printed matter even in the reduction of the consumption of the toner.

The MFP 10, in the reduction of the consumption of the toner (NO in Step S101), converts the point Q into the point Q' as the converted input color values while maintaining the values of the point Q, where the point Q as the input color values is the point K as the lowest brightness color values in the constant hue plane of the input color values (Step S108). This ensures that the MFP 10 can accurately reproduce the black color in the printed matter even in the reduction of the consumption of the toner. Therefore, the MFP 10 can prevent the object to be printed in black color, such as a black character, from being dimmed to be hard to be recognized.

The MFP 10, in the reduction of the consumption of the toner (NO in Step S101), converts the point Q into the point Q' as the converted input color values while maintaining the values of the point Q, for example as illustrated in FIG. 11C, when the point Q as the input color values is on the straight line KW as well as is the point K (Step S108).

In the reduction of the consumption of the toner (NO in Step S101), an amount of change from the input color values to the converted input color values is smaller than that of the configurations of reducing the consumption of the toner by the methods illustrated in FIG. 14B or FIG. 14C, when the MFP 10 converts the input color values in the part having lower brightness into the converted input color values in the constant hue plane of the input color values (Step S108). This ensures that the MFP 10 can print a sharp image, even in the reduction of the consumption of the toner.

The MFP 10 compresses the color gamut of the RGB values as the input color values, that is, changes the input color values to reduce the consumption of the toner. This ensures the reduced consumption of the toner without loss of the balance of the color composed of at least two colors among cyan, magenta, yellow, and black, in comparison with the gamma-control type reduction method.

The MFP 10 calculates to generate the converted input color values from the input color values in the print data (Step S107 and Step S108). This can eliminate the need for storing a color conversion table for the reduction of the consumption of the toner in a storage device such as the ROM of the control unit 18, the RAM of the control unit 18, or the storage unit 17.

The MFP 10 automatically reduces the consumption of the toner by switching between the normal mode and the reduction mode according to a type of application software that has generated the input color value (Step S101), and accordingly this ensures improvement of convenience.

The MFP 10 may switch between the normal mode and the reduction mode corresponding to the instruction via the operation unit 11 or the network communication unit 16.

The MFP 10 employs the CIELAB color space as a device independent color space. However, CIEXYZ color space, CIELCh color space, or similar color space other than the CIELAB color space may be also employed as the device independent color space.

The MFP 10 includes the RGB color conversion table 17b for the conversion of the RGB values as the input color values into the Lab values, and CMYK color conversion table 17c for the conversion of the Lab values into the CMYK values as the output color values. However, the MFP 10 may include a color conversion table that directly converts the RGB values as the input color values into the CMYK values as the output color values by employing a device link profile. This can reduce the amount of data necessary for the color conversion table.

C. Second Embodiment:

A second embodiment is similar with the first embodiment, except as described below.

Figure 12A:
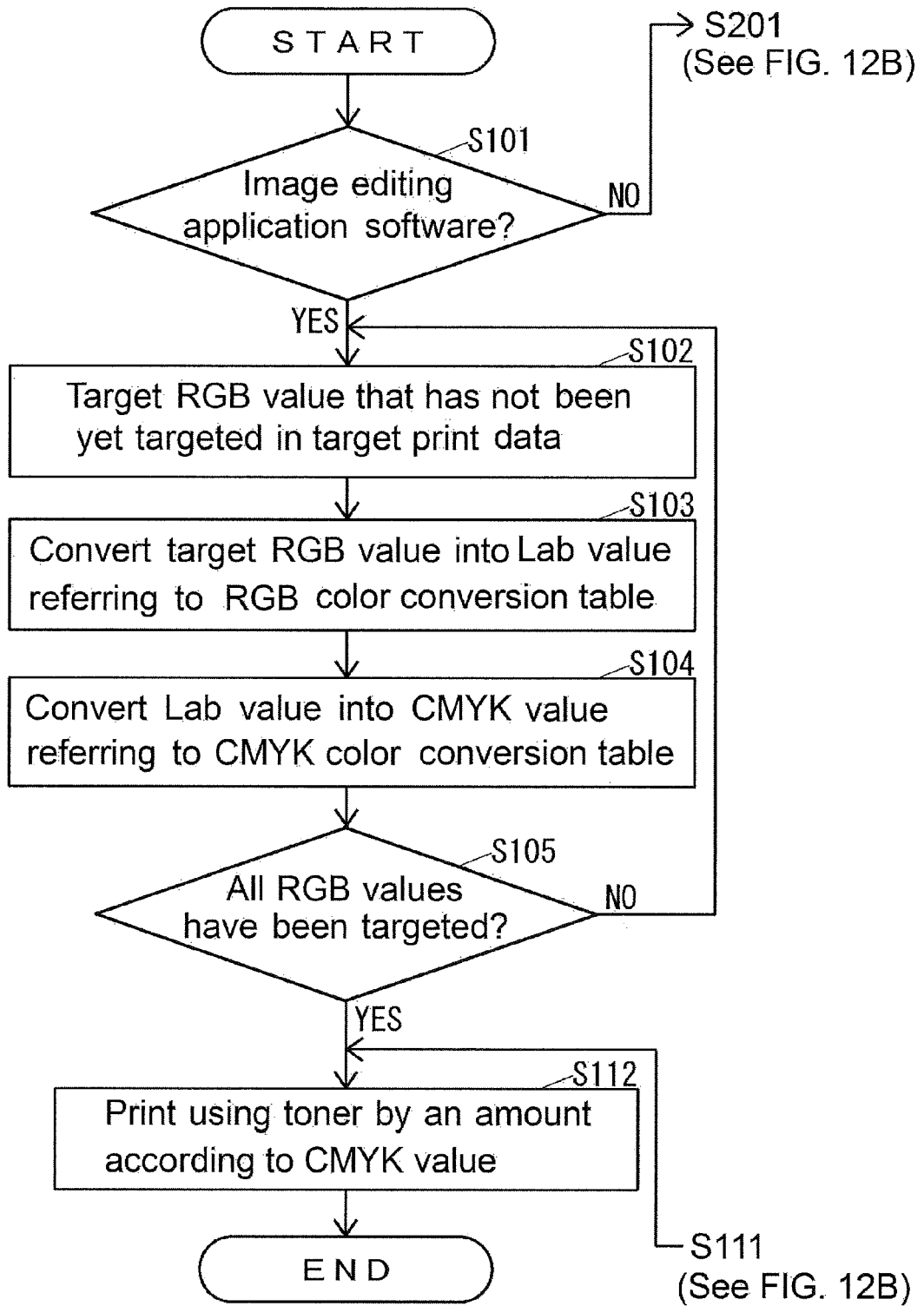
FIGS. 12A and 12B illustrate operations of an MFP according to a second embodiment of the disclosure.
Figure 12B:
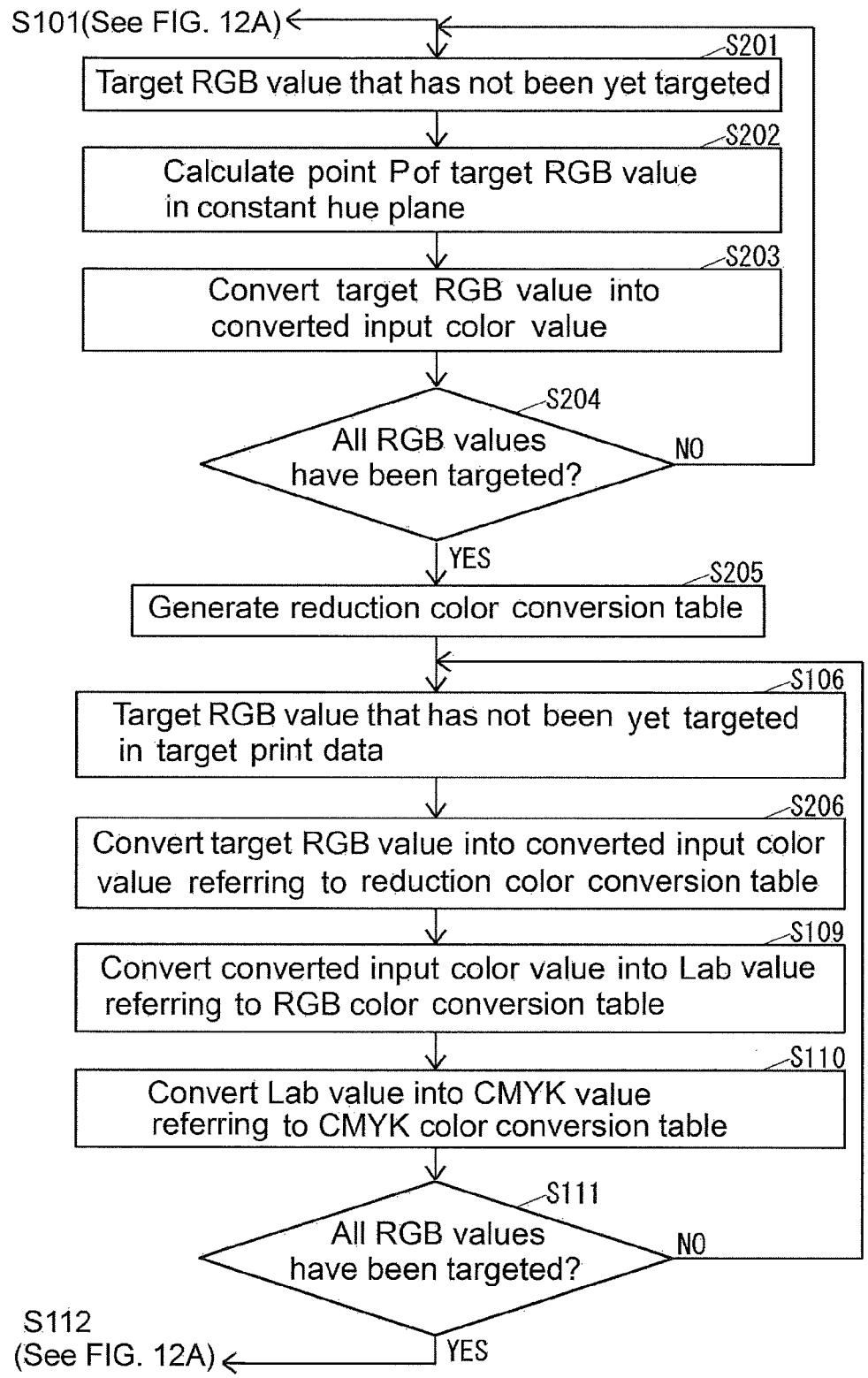

FIGS. 12A and 12B illustrate the operations of the MFP 10 according to the embodiment.

The operations illustrated in FIGS. 12A and 12B are similar with the operations illustrated in FIGS. 3A and 3B, except as described below.

As illustrated in FIG. 12A, the converted input color value generating unit 18b targets the one value that has not been yet targeted among the RGB values capable of becoming the input color values, when the determination in S101 is that the target print data are generated by not the image editing application software but namely, document application software other than the image editing application software (S201).

Subsequently, the converted input color value generating unit 18b calculates the RGB values of the point P at which the saturation is maximized in the constant hue plane of the RGB values targeted in S201, namely the target RGB value, in the identical manner as the process S107 illustrated in FIG. 3B (S202).

Subsequently, the converted input color value generating unit 18b refers to the reduction rule to convert the target RGB value into the converted input color values, in the identical manner as the process S108 illustrated in FIG. 3B (S203).

Then, the converted input color values generating unit 18b determines whether or not the all RGB values capable of becoming the input color values have been targeted (S204).

The converted input color value generating unit 18b performs the process S201, when the determination in S204 is that the all RGB values capable of becoming the input color values have not been targeted.

The converted input color value generating unit 18b generates a reduction color conversion table when the determination in S204 is that the all RGB values capable of becoming the input color values have been targeted (S205). The reduction color conversion table converts the input color values into the converted input color values based on the correspondence relationship between the RGB values as the input color values before the conversion in S203 and the RGB values as the converted input color values converted in S203.

Subsequently, the converted input color value generating unit 18b targets the one value that has not been yet targeted among the RGB values as the input color values included in the target print data (S106).

Subsequently, the converted input color value generating unit 18b converts the RGB values targeted in S106, namely the target RGB value into the converted input color values with reference to the reduction color conversion table generated in S205 (S206).

And then, the output color value generating unit 18a performs the process S109 after the process of S206.

As described above, the MFP 10 according to the embodiment generates the reduction color conversion table as the color conversion table for the reduction of the consumption of the toner. This can eliminate the need for continuously storing the color conversion table for the reduction of the consumption of the toner in a non-volatile storage device such as the storage unit 17, the ROM of the control unit 18, or similar device.

The MFP 10 according to the embodiment generates the reduction color conversion table in the process between S101 and S106. However, the MFP 10 may generate the reduction color conversion table before the operations illustrated in FIGS. 12A and 12B.

The MFP 10 may continuously store the reduction color conversion table in the non-volatile storage device such as the storage unit 17, the ROM of the control unit 18 rather than generates the reduction color conversion table.

D. Third Embodiment:

A third embodiment is similar with the first embodiment, except as described below.

Figure 13A:
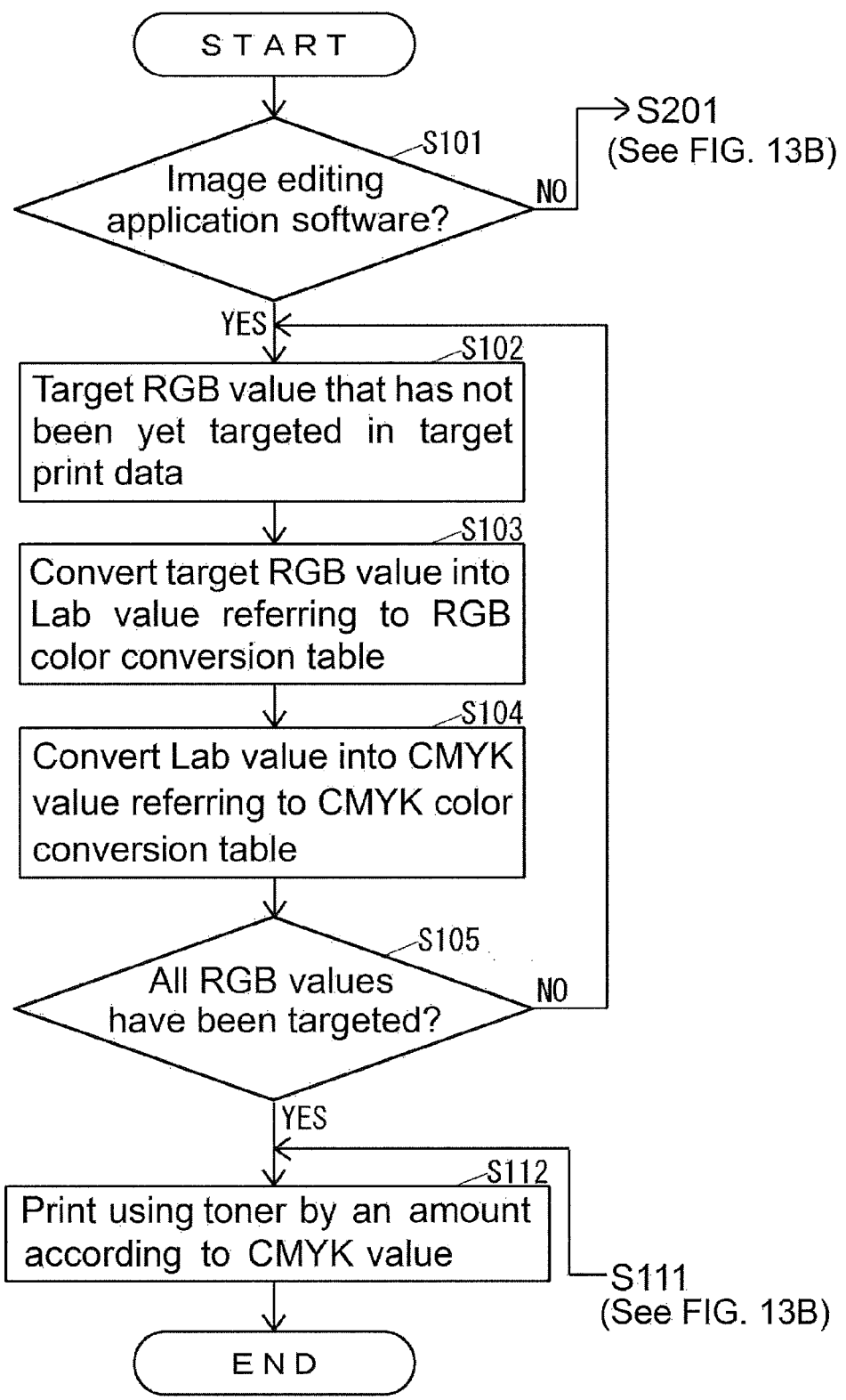
FIGS. 13A and 13B illustrate operations of an MFP according to a third embodiment of the disclosure.
Figure 13B:
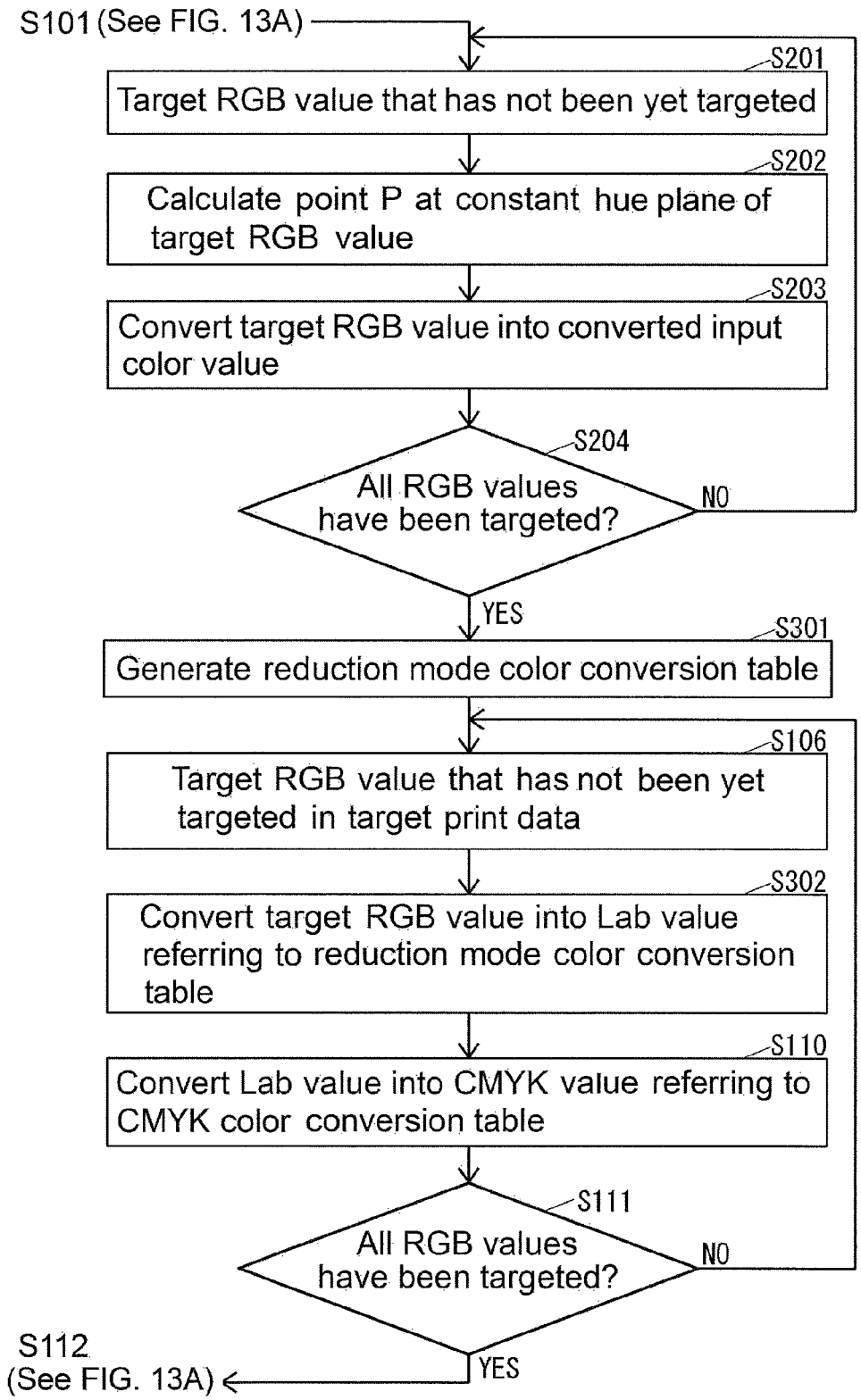

FIGS. 13A and 13B illustrate the operations of the MFP 10 according to the embodiment.

The operations illustrated in FIGS. 13A and 13B are similar with the operations illustrated in FIGS. 12A and 12B, except as described below.

As illustrated in FIG. 13A, the converted input color value generating unit 18b generates a reduction mode color conversion table that converts the input color values into the Lab values for the reduction mode, when the determination in Step S204 is that all the RGB values capable of becoming the input color values have been targeted (Step S301). Here, the converted input color value generating unit 18b generates the reduction color conversion table based on the correspondence relationship between the RGB values as the input color values before the conversion in Step S203 and the RGB values as the converted input color values converted in Step S203, and the RGB color conversion table 17b identical with the RGB color conversion table 17b used in Step S103. Specifically, the converted input color value generating unit 18b generates the correspondence relationship between the RGB values as the input color values before the conversion in Step S203 and the Lab values where the RGB values as the converted input color values, which has been converted from the above-described RGB values in Step S203, has been converted as the input color values with reference to the RGB color conversion table 17b, as the reduction mode color conversion table.

Subsequently, the output color value generating unit 18a targets one RGB value that has not been yet targeted among the RGB values as the input color values included in the target print data (Step S106).

Subsequently, the output color value generating unit 18a converts the RGB value targeted in Step S106, namely the target RGB value into the Lab value with reference to the reduction mode color conversion table generated in Step S301 (Step S302).

And then, the output color value generating unit 18a converts the Lab value generated in Step S302 into the CMYK value as the output color values with reference to the CMYK color conversion table 17c identical with the CMYK color conversion table 17c used in Step S104 (Step S110).

As described above, the MFP 10 according to the embodiment generates the reduction mode color conversion table as the color conversion table for the reduction of the consumption of the toner. This can eliminate the need for continuously storing the color conversion table for the reduction of the consumption of the toner in the non-volatile storage device such as the storage unit 17, or the ROM of the control unit 18.

The MFP 10 according to the embodiment generates the reduction mode color conversion table in the process between Step S101 and Step S106. However, the MFP 10 may also generate the reduction mode color conversion table before the operations illustrated in FIGS. 13A and 13B.

The MFP 10 may continuously store the reduction mode color conversion table in the non-volatile storage device such as the storage unit 17, or the ROM of the control unit 18 rather than generates the reduction mode color conversion table.

As described above, the reduction mode color conversion table is a color conversion table that converts the RGB values as the input color values into the Lab values for the reduction mode. However, the reduction mode color conversion table may be generated based on not only the RGB color conversion table 17b but the CMYK color conversion table 17c. That is, the reduction mode color conversion table may be generated as a color conversion table that directly converts the RGB values as the input color values into the CMYK values as the output color values for the reduction mode.

While the image forming apparatus of the disclosure is an MFP according to the embodiment as described above, an image forming apparatus other than the MFP such as a printer-only machine may be applicable, insofar as the image forming apparatus that performs printing using a color material by an amount according to an output color value converted from an input color value.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus that performs printing using a color material by an amount according to an output color value converted from an input color value, comprising:
a control unit that i) includes at least a normal mode and a reduction mode for reducing the amount of a consumption of the color material compared with the normal mode, and ii) compresses a color gamut of the input color value by a reduction rule when the reduction mode is selected,
wherein the reduction rule includes a rule of conversion configured to, in a constant hue plane of the input color value, move all color values on a straight line passing through a lowest brightness color value and the input color value in a direction from a highest saturation color value to a highest brightness color value, so as to convert into color values on a straight line passing through the lowest brightness color value and a converted input color value where the input color value is converted,
the lowest brightness color value representing a color value of lowest brightness, the highest saturation color value representing a color value of highest saturation, the highest brightness color value representing a color value of highest brightness,
the control unit including:
an output color value generating circuit that converts the input color value into the output color value by a specific rule; and
a conversion input color value generating circuit that converts the input color value into the converted input color value by the reduction rule,
wherein:
the output color value generating circuit converts, when the reduction mode is selected, the converted input color value into the output color value by the specific rule including a RGB color conversion table and a CMYK color conversion table; and
the conversion input color value generating circuit generates the converted input color value from the input color value in print data by a calculation based on the reduction rule,
wherein the calculation includes:
i) calculating a RGB value of a point P from the RGB value of a point Q based on a formula (1), $$\begin{bmatrix} P_r \\ P_g \\ P_b \end{bmatrix} = \frac{1}{\max(Q) - \min(Q)} \begin{bmatrix} Q_r - \min(Q) \\ Q_g - \min(Q) \\ Q_b - \min(Q) \end{bmatrix} \quad \text{Formula (1)}$$

the point P representing the highest saturation color value in the constant hue plane of the input color value, the point Q representing the input color value, the min (Q) representing a minimum value among a R value, a G value, and a B value of the RGB value of the point Q, and the max (Q) representing a maximum value among the R value, the G value, and the B value of the RGB value of the point Q; and
ii) calculating the RGB value of a point Q' from the RGB value of the point P based on a formula (2), $$\begin{bmatrix} Q'_r \\ Q'_g \\ Q'_b \end{bmatrix} = \begin{bmatrix} Q_r \\ Q_g \\ Q_b \end{bmatrix} + (1 - \alpha)\{\max(Q) - \min(Q)\} \begin{bmatrix} 1 - P_r \\ 1 - P_g \\ 1 - P_b \end{bmatrix} \quad \text{Formula (2)}$$

the point Q' representing the converted input color value, and α representing a compression ratio of the color gamut of the input color value.

2. The image forming apparatus according to claim 1, wherein
the conversion input color value generating circuit generates a reduction color conversion table based on the reduction rule, the reduction color conversion table converting the input color value into the converted input color value, the conversion input color value generating circuit generating the converted input color value from the input color value in print data using the generated reduction color conversion table.

3. The image forming apparatus according to claim 1, wherein:
the specific rule at least includes a conversion using a conversion table, the conversion table converting the input color value into a color value other than the input color value,
the conversion input color value generating circuit generates a reduction mode color conversion table for the reduction mode using the generated converted input color value and the conversion table; and
when the mode of the image forming apparatus is in the reduction mode, the output color value generating circuit converts the input color value in print data into the output color value at least using the reduction mode color conversion table.

4. The image forming apparatus according to claim 1, wherein the output color value generating circuit switches between the operation mode and the reduction mode according to a type of application software that has generated the input color value.

5. A non-transitory computer-readable recording medium storing a color conversion program executed by an image forming apparatus that performs printing using a color material by an amount according to an output color value converted from an input color value, the color conversion program causing a computer to function as:

a control unit that i) includes at least a normal mode and a reduction mode for reducing the amount of a consumption of the color material compared with the normal mode, and ii) compresses a color gamut of the input color value by a reduction rule when the reduction mode is selected, wherein the reduction rule includes a rule of conversion configured to, in a constant hue plane of the input color value, move all color values on a straight line passing through a lowest brightness color value and the input color value in a direction from a highest saturation color value to a highest brightness color value, so as to convert into color values on a straight line passing through the lowest brightness color value and a converted input color value where the input color value is converted, the lowest brightness color value representing a color value of lowest brightness, the highest saturation color value representing a color value of highest saturation, the highest brightness color value representing a color value of highest brightness, the control unit including:

an output color value generating circuit that converts the input color value into the output color value by a specific rule; and a conversion input color value generating circuit that converts the input color value into the converted input color value by the reduction rule, wherein:

the output color value generating circuit converts, when the reduction mode is selected, the converted input color value into the output color value by the specific rule being a RGB color conversion table and a CMYK color conversion table; and the conversion input color value generating circuit generates the converted input color value from the input color value in print data by a calculation based on the reduction rule, wherein the calculation includes:

i) calculating a RGB value of a point P from the RGB value of a point Q based on a formula (1), $$\begin{bmatrix} P_r \\ P_g \\ P_b \end{bmatrix} = \frac{1}{\max(Q) - \min(Q)} \begin{bmatrix} Q_r - \min(Q) \\ Q_g - \min(Q) \\ Q_b - \min(Q) \end{bmatrix} \quad \text{Formula (1)}$$

the point P representing the highest saturation color value in the constant hue plane of the input color value, the point Q representing the input color value, the min (Q) representing a minimum value among a R value, a G value, and a B value of the RGB value of the point Q, and the max (Q) representing a maximum value among the R value, the G value, and the B value of the RGB value of the point Q; and ii) calculating the RGB value of a point Q' from the RGB value of the point P based on a formula (2), $$\begin{bmatrix} Q'_r \\ Q'_g \\ Q'_b \end{bmatrix} = \begin{bmatrix} Q_r \\ Q_g \\ Q_b \end{bmatrix} + (1-\alpha)\{\max(Q) - \min(Q)\} \begin{bmatrix} 1 - P_r \\ 1 - P_g \\ 1 - P_b \end{bmatrix} \quad \text{Formula (2)}$$

the point Q' representing the converted input color value, and α representing a compression ratio of the color gamut of the input color value.

6. A color conversion method for an image forming apparatus that performs printing using a color material by an amount according to an output color value converted from an input color value, the color conversion method comprising:

providing a control unit that i) includes at least a normal mode and a reduction mode for reducing the amount of a consumption of the color material compared with the normal mode, and ii)

compresses a color gamut of the input color value by a reduction rule when the reduction mode is selected, wherein the reduction rule includes a rule of conversion configured to, in a constant hue plane of the input color value, move all color values on a straight line passing through a lowest brightness color value and the input color value in a direction from a highest saturation color value to a highest brightness color value, so as to convert into color values on a straight line passing through the lowest brightness color value and a converted input color value where the input color value is converted, the lowest brightness color value representing a color value of lowest brightness, the highest saturation color value representing a color value of highest saturation, the highest brightness color value representing a color value of highest brightness, the color conversion method further comprising:

via the control unit, converting, when the reduction mode is selected, the converted input color value into the output color value by a specific rule including a RGB color conversion table and a CMYK color conversion table;

generating the converted input color value from the input color value in print data by a calculation based on the reduction rule;

wherein the calculation includes:

i) calculating a RGB value of a point P from the RGB value of a point Q based on a formula (1), $$\begin{bmatrix} P_r \\ P_g \\ P_b \end{bmatrix} = \frac{1}{\max(Q) - \min(Q)} \begin{bmatrix} Q_r - \min(Q) \\ Q_g - \min(Q) \\ Q_b - \min(Q) \end{bmatrix} \quad \text{Formula (1)}$$

the point P representing the highest saturation color value in the constant hue plane of the input color value, the point Q representing the input color value, the min (Q) representing a minimum value among a R value, a G value, and a B value of the RGB value of the point Q, and the max (Q) representing a maximum value among the R value, the G value, and the B value of the RGB value of the point Q; and ii) calculating the RGB value of a point Q' from the RGB value of the point P based on a formula (2), $$\begin{bmatrix} Q'_r \\ Q'_g \\ Q'_b \end{bmatrix} = \begin{bmatrix} Q_r \\ Q_g \\ Q_b \end{bmatrix} + (1-\alpha)\{\max(Q) - \min(Q)\} \begin{bmatrix} 1-P_r \\ 1-P_g \\ 1-P_b \end{bmatrix} \quad \text{Formula (2)}$$

the point Q' representing the converted input color value, and $\alpha$ representing a compression ratio of the color gamut of the input color value.

* * * * *